United States Patent
Xiong et al.

(10) Patent No.: US 11,039,434 B2
(45) Date of Patent: Jun. 15, 2021

(54) USER EQUIPMENT AND METHOD FOR RESOURCE ALLOCATION AND DEVICE-TO-DEVICE DISCOVERY HOPPING

(71) Applicant: Apple Inc., Cupertino, CA (US)

(72) Inventors: Gang Xiong, Beaverton, OR (US); Huaning Niu, Milpitas, CA (US); Debdeep Chatterjee, Santa Clara, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 772 days.

(21) Appl. No.: 14/778,528

(22) PCT Filed: Mar. 27, 2014

(86) PCT No.: PCT/US2014/031996
§ 371 (c)(1),
(2) Date: Sep. 18, 2015

(87) PCT Pub. No.: WO2014/209451
PCT Pub. Date: Dec. 31, 2014

(65) Prior Publication Data
US 2016/0100401 A1    Apr. 7, 2016

Related U.S. Application Data

(60) Provisional application No. 61/841,230, filed on Jun. 28, 2013.

(51) Int. Cl.
*H04W 72/04* (2009.01)
*H04W 76/10* (2018.01)
(Continued)

(52) U.S. Cl.
CPC ........ *H04W 72/0446* (2013.01); *H04B 7/024* (2013.01); *H04B 7/0452* (2013.01);
(Continued)

(58) Field of Classification Search
CPC . H04W 72/0446; H04W 48/16; H04W 8/005; H04W 40/24; H04W 40/246
See application file for complete search history.

(56) References Cited

U.S. PATENT DOCUMENTS

| 5,471,647 A | 11/1995 | Gerlach et al. |
| 8,160,976 B2 | 4/2012 | Dwyer et al. |

(Continued)

FOREIGN PATENT DOCUMENTS

| CN | 1728593 A | 2/2006 |
| CN | 1973473 A | 5/2007 |

(Continued)

OTHER PUBLICATIONS

US 9,635,667 B1, 04/2017, Shirani-Mehr et al. (withdrawn)
(Continued)

*Primary Examiner* — Rafael Pérez-Gutiérrez
*Assistant Examiner* — Xiang Zhang
(74) *Attorney, Agent, or Firm* — Kowert Hood Munyon Rankin and Goetzel PC

(57) ABSTRACT

Embodiments of a user equipment (UE) and method for resource allocation and device-to-device (D2D) discovery hopping are generally described herein. In some embodiments, the UE may receive signaling from an enhanced node B (eNB) indicating discovery resources to transmit discovery signals on within an LTE operation zone. The discovery resources may include a discovery zone which may comprise a plurality of physical resource blocks (PRBs) and a plurality of subframes. The UE may transmit a discovery signal for receipt by one or more other UEs for D2D discovery within some of the PRBs of the discovery zone. The PRBs for the transmission of the discovery signal may be determined in accordance with a hopping mode to provide increased frequency diversity within a bandwidth of
(Continued)

the discovery zone. The hopping mode may comprise intra-subframe hopping, inter-subframe hopping or joint intra/inter-subframe hopping.

20 Claims, 5 Drawing Sheets

(51) Int. Cl.
H04W 76/19 (2018.01)
H04W 76/30 (2018.01)
H04W 24/10 (2009.01)
H04B 7/0452 (2017.01)
H04B 7/06 (2006.01)
H04W 56/00 (2009.01)
H04W 72/02 (2009.01)
H04L 25/02 (2006.01)
H04L 25/03 (2006.01)
H04W 88/02 (2009.01)
H04W 16/14 (2009.01)
H04W 8/00 (2009.01)
H04W 48/16 (2009.01)
H04L 12/18 (2006.01)
H04W 74/00 (2009.01)
H04W 74/08 (2009.01)
H04W 36/02 (2009.01)
H04W 68/04 (2009.01)
H04B 7/024 (2017.01)
H04J 11/00 (2006.01)
H04L 5/14 (2006.01)
H04W 48/12 (2009.01)
H04W 84/18 (2009.01)
H04W 88/06 (2009.01)
H04W 84/04 (2009.01)

(52) U.S. Cl.
CPC .......... H04B 7/0626 (2013.01); H04J 11/005 (2013.01); H04L 5/1469 (2013.01); H04L 12/18 (2013.01); H04L 25/021 (2013.01); H04L 25/0242 (2013.01); H04L 25/03891 (2013.01); H04W 8/005 (2013.01); H04W 16/14 (2013.01); H04W 24/10 (2013.01); H04W 36/02 (2013.01); H04W 48/16 (2013.01); H04W 56/0005 (2013.01); H04W 68/04 (2013.01); H04W 72/02 (2013.01); H04W 72/042 (2013.01); H04W 74/004 (2013.01); H04W 74/006 (2013.01); H04W 74/0816 (2013.01); H04W 76/10 (2018.02); H04W 76/19 (2018.02); H04W 76/30 (2018.02); H04W 88/02 (2013.01); H04W 48/12 (2013.01); H04W 72/0406 (2013.01); H04W 84/045 (2013.01); H04W 84/18 (2013.01); H04W 88/06 (2013.01)

(56) References Cited

U.S. PATENT DOCUMENTS

| | | |
|---|---|---|
| 8,170,081 B2 | 5/2012 | Forenza et al. |
| 8,213,978 B1 | 7/2012 | Ho et al. |
| 8,259,599 B2 | 9/2012 | Ghady et al. |
| 8,462,688 B1 | 6/2013 | Dinan |
| 8,547,969 B2 | 10/2013 | Watfa et al. |
| 8,565,793 B1 | 10/2013 | Koodli |
| 8,654,815 B1 | 2/2014 | Forenza et al. |
| 8,682,354 B2 | 3/2014 | Zhong et al. |
| 8,965,338 B2 | 2/2015 | Luft et al. |
| 9,025,479 B2 | 5/2015 | Gaal et al. |
| 9,046,591 B1 | 6/2015 | Yang et al. |
| 9,179,328 B2 | 11/2015 | Li et al. |
| 9,320,063 B2 | 4/2016 | Zaus |
| 9,655,107 B2 | 5/2017 | Shirani-Mehr et al. |
| 9,750,017 B2 | 8/2017 | Zaus |
| 9,794,870 B2 | 10/2017 | Vannithamby et al. |
| 9,814,037 B2 | 11/2017 | Xue et al. |
| 10,420,100 B2 | 9/2019 | Zaus |
| 2004/0014501 A1 | 1/2004 | Kuwahara et al. |
| 2006/0007043 A1 | 1/2006 | Xin |
| 2006/0292990 A1 | 12/2006 | Karabinis et al. |
| 2007/0211813 A1 | 9/2007 | Talwar et al. |
| 2008/0170504 A1 | 7/2008 | Petrovic et al. |
| 2008/0305805 A1 | 12/2008 | Mondal et al. |
| 2009/0323841 A1 | 12/2009 | Clerckx et al. |
| 2010/0046643 A1 | 2/2010 | Mondal et al. |
| 2010/0054237 A1 | 3/2010 | Han et al. |
| 2010/0056216 A1 | 3/2010 | Li |
| 2010/0265841 A1 | 10/2010 | Rong et al. |
| 2010/0316034 A1 | 12/2010 | Burbidge et al. |
| 2010/0316154 A1 | 12/2010 | Park et al. |
| 2011/0069618 A1 | 3/2011 | Wong et al. |
| 2011/0103305 A1 | 5/2011 | Ali et al. |
| 2011/0143759 A1 | 6/2011 | Choi et al. |
| 2011/0149852 A1 | 6/2011 | Olsson et al. |
| 2011/0164668 A1 | 7/2011 | Hoek et al. |
| 2011/0164696 A1 | 7/2011 | Choi et al. |
| 2011/0194638 A1 | 8/2011 | Erell et al. |
| 2011/0216846 A1 | 9/2011 | Lee et al. |
| 2011/0244847 A1 | 10/2011 | Mallik et al. |
| 2011/0249637 A1 | 10/2011 | Hammarwall et al. |
| 2011/0268101 A1 | 11/2011 | Wang et al. |
| 2011/0275371 A1 | 11/2011 | Roger |
| 2012/0014462 A1 | 1/2012 | Zummo et al. |
| 2012/0071163 A1 | 3/2012 | Klingenbrunn et al. |
| 2012/0082082 A1 | 4/2012 | Etemad et al. |
| 2012/0120789 A1 | 5/2012 | Ramachandran et al. |
| 2012/0128089 A1 | 5/2012 | Tsutsui |
| 2012/0163235 A1 | 6/2012 | Ho et al. |
| 2012/0165019 A1 | 6/2012 | Shintani et al. |
| 2012/0252429 A1 | 10/2012 | Yoshizawa |
| 2012/0258729 A1 | 10/2012 | Siomina et al. |
| 2012/0275401 A1 | 11/2012 | Sun |
| 2012/0281783 A1 | 11/2012 | Cheng et al. |
| 2012/0322489 A1 | 12/2012 | Liu et al. |
| 2013/0021925 A1 | 1/2013 | Yin et al. |
| 2013/0034082 A1 | 2/2013 | Etemad et al. |
| 2013/0039244 A1 | 2/2013 | Sun |
| 2013/0064129 A1 | 3/2013 | Koivisto et al. |
| 2013/0070703 A1 | 3/2013 | Yasukawa et al. |
| 2013/0077513 A1 | 3/2013 | Ng et al. |
| 2013/0083661 A1 | 4/2013 | Gupta et al. |
| 2013/0083777 A1 | 4/2013 | Rydnell et al. |
| 2013/0088983 A1 | 4/2013 | Pragada et al. |
| 2013/0107849 A1 | 5/2013 | Park |
| 2013/0107977 A1 | 5/2013 | Lakkis |
| 2013/0114576 A1 | 5/2013 | Kwon et al. |
| 2013/0121185 A1 | 5/2013 | Li et al. |
| 2013/0153298 A1 | 6/2013 | Pietraski et al. |
| 2013/0155962 A1 | 6/2013 | Hakola et al. |
| 2013/0157670 A1 | 6/2013 | Koskela et al. |
| 2013/0163457 A1 | 6/2013 | Kim et al. |
| 2013/0201852 A1 | 8/2013 | Chou et al. |
| 2013/0201884 A1 | 8/2013 | Freda |
| 2013/0230081 A1 | 9/2013 | Wernersson et al. |
| 2013/0272254 A1 | 10/2013 | Goto et al. |
| 2013/0273924 A1* | 10/2013 | Hakola ............. H04W 72/0413 455/450 |
| 2013/0288608 A1* | 10/2013 | Fwu ...................... H04W 72/02 455/63.1 |
| 2013/0322413 A1 | 12/2013 | Pelletier et al. |
| 2014/0003262 A1 | 1/2014 | He et al. |
| 2014/0010221 A1 | 1/2014 | Panian et al. |
| 2014/0024386 A1 | 1/2014 | Novak et al. |
| 2014/0050086 A1 | 2/2014 | Himayat et al. |
| 2014/0051443 A1 | 2/2014 | Diachina et al. |
| 2014/0056220 A1* | 2/2014 | Poitau ................. H04W 40/246 370/328 |
| 2014/0056246 A1 | 2/2014 | Chun et al. |
| 2014/0098900 A1 | 4/2014 | Bayesteh et al. |

(56) References Cited

U.S. PATENT DOCUMENTS

| | | | |
|---|---|---|---|
| 2014/0126549 A1* | 5/2014 | Beale | H04W 16/08 |
| | | | 370/336 |
| 2014/0128092 A1 | 5/2014 | Xiong et al. | |
| 2014/0133401 A1 | 5/2014 | Kaura et al. | |
| 2014/0171054 A1 | 6/2014 | Cai et al. | |
| 2014/0171062 A1* | 6/2014 | Fallgren | H04W 40/22 |
| | | | 455/422.1 |
| 2014/0177487 A1* | 6/2014 | Hammarwall | H04W 72/042 |
| | | | 370/280 |
| 2014/0177744 A1 | 6/2014 | Krishnamurthy | |
| 2014/0185495 A1 | 7/2014 | Kuchibhotla et al. | |
| 2014/0206367 A1 | 7/2014 | Agee et al. | |
| 2014/0211673 A1 | 7/2014 | Lu et al. | |
| 2014/0213259 A1 | 7/2014 | Teyeb et al. | |
| 2014/0219095 A1 | 8/2014 | Lim et al. | |
| 2014/0241256 A1* | 8/2014 | Jiang | H04W 72/1215 |
| | | | 370/329 |
| 2014/0286284 A1 | 9/2014 | Lim et al. | |
| 2014/0321313 A1 | 10/2014 | Seo et al. | |
| 2014/0355562 A1 | 12/2014 | Gao et al. | |
| 2014/0370904 A1 | 12/2014 | Smith et al. | |
| 2015/0003325 A1 | 1/2015 | Sajadieh et al. | |
| 2015/0003326 A1 | 1/2015 | Zaus | |
| 2015/0003338 A1 | 1/2015 | Xue et al. | |
| 2015/0003543 A1 | 1/2015 | Shirani-mehr et al. | |
| 2015/0004980 A1 | 1/2015 | Vannithamby et al. | |
| 2015/0004995 A1 | 1/2015 | Koc et al. | |
| 2015/0050930 A1* | 2/2015 | Seo | H04W 76/14 |
| | | | 455/434 |
| 2015/0056993 A1 | 2/2015 | Zhu et al. | |
| 2015/0139006 A1* | 5/2015 | Seo | H04J 11/005 |
| | | | 370/252 |
| 2015/0223197 A1 | 8/2015 | Kim et al. | |
| 2015/0264551 A1* | 9/2015 | Ko | H04W 76/14 |
| | | | 370/329 |
| 2015/0282029 A1 | 10/2015 | Faccin et al. | |
| 2015/0296354 A1 | 10/2015 | Liao et al. | |
| 2015/0304953 A1 | 10/2015 | Sun | |
| 2015/0349924 A1* | 12/2015 | Wang | H04L 1/0061 |
| | | | 714/807 |
| 2016/0037421 A1 | 2/2016 | Jokinen et al. | |
| 2016/0119967 A1 | 4/2016 | Zaus | |
| 2016/0278069 A1* | 9/2016 | Lee | H04W 48/08 |
| 2017/0181084 A1 | 6/2017 | Sun | |
| 2017/0359823 A1 | 12/2017 | Zaus | |
| 2018/0098261 A1 | 4/2018 | Wang et al. | |
| 2018/0110049 A1 | 4/2018 | Xue et al. | |
| 2018/0368144 A1 | 12/2018 | Xiong et al. | |

FOREIGN PATENT DOCUMENTS

| | | |
|---|---|---|
| CN | 101155413 A | 4/2008 |
| CN | 101394215 A | 3/2009 |
| CN | 101647246 A | 2/2010 |
| CN | 101771442 A | 7/2010 |
| CN | 101800582 A | 8/2010 |
| CN | 101807978 A | 8/2010 |
| CN | 101815325 A | 8/2010 |
| CN | 101835159 A | 9/2010 |
| CN | 101944981 A | 1/2011 |
| CN | 102084708 A | 6/2011 |
| CN | 102158964 A | 8/2011 |
| CN | 102217360 A | 10/2011 |
| CN | 102301796 A | 12/2011 |
| CN | 102484885 A | 5/2012 |
| CN | 102781110 A | 11/2012 |
| CN | 102792605 A | 11/2012 |
| CN | 102859925 A | 1/2013 |
| CN | 102883440 A | 1/2013 |
| CN | 102948216 A | 2/2013 |
| CN | 104254067 A | 12/2014 |
| CN | 105229934 A | 1/2016 |
| CN | 105229942 A | 1/2016 |
| CN | 105230053 A | 1/2016 |
| CN | 105247924 A | 1/2016 |
| CN | 105264788 A | 1/2016 |
| CN | 105284059 A | 1/2016 |
| CN | 103004160 A | 3/2017 |
| CN | 104254067 B | 2/2018 |
| CN | 105229934 B | 10/2018 |
| CN | 109195148 | 1/2019 |
| CN | 109561463 | 4/2019 |
| CN | 105284059 | 6/2019 |
| EP | 1267443 A2 | 12/2002 |
| EP | 2584804 A1 | 4/2013 |
| EP | 2590336 A1 | 5/2013 |
| EP | 3014787 A1 | 5/2016 |
| EP | 3014788 A1 | 5/2016 |
| EP | 3014790 A1 | 5/2016 |
| EP | 3014909 A1 | 5/2016 |
| EP | 3014923 A1 | 5/2016 |
| EP | 2827649 B1 | 3/2018 |
| EP | 3014909 | 2/2019 |
| HK | 1219355 A1 | 3/2017 |
| HK | 1219356 A1 | 3/2017 |
| HK | 1219380 A1 | 3/2017 |
| JP | 2011259263 A | 12/2012 |
| JP | 2016525305 A | 8/2016 |
| JP | 6409871 B2 | 10/2018 |
| KR | 1020120030548 A | 3/2012 |
| KR | 20120138791 A | 12/2012 |
| KR | 1020120138791 A | 12/2012 |
| KR | 20130016380 | 2/2013 |
| KR | 1020130021569 A | 3/2013 |
| KR | 1020130028106 A | 3/2013 |
| KR | 1020130040749 A | 4/2013 |
| KR | 1020160003021 A | 1/2016 |
| KR | 101855426 B1 | 4/2018 |
| KR | 101857643 B1 | 5/2018 |
| TW | 201316712 A | 4/2013 |
| TW | 201517660 A | 5/2015 |
| TW | 201635825 A | 10/2016 |
| TW | I552624 B | 10/2016 |
| TW | I603643 B | 10/2017 |
| TW | 201811079 A | 3/2018 |
| WO | WO-2010043752 A1 | 4/2010 |
| WO | WO-2010088826 A1 | 8/2010 |
| WO | WO-2010150568 A1 | 12/2010 |
| WO | WO-2011121374 A1 | 10/2011 |
| WO | WO-2011138495 A1 | 11/2011 |
| WO | WO-2012000535 A1 | 1/2012 |
| WO | WO-2012050842 A1 | 4/2012 |
| WO | WO-2012125931 A1 | 9/2012 |
| WO | WO-2013010418 A1 | 1/2013 |
| WO | WO-2013012222 A2 | 1/2013 |
| WO | 2013025008 | 2/2013 |
| WO | WO-2013028128 A1 | 2/2013 |
| WO | WO-2013081377 A1 | 6/2013 |
| WO | WO-2014158255 A1 | 10/2014 |
| WO | WO-2014209451 A1 | 12/2014 |
| WO | WO-2014210441 A1 | 12/2014 |
| WO | WO-2014210471 A1 | 12/2014 |
| WO | WO-2014210477 A1 | 12/2014 |
| WO | WO-2014210493 A1 | 12/2014 |
| WO | WO-2014210500 A1 | 12/2014 |

OTHER PUBLICATIONS

"International Application Serial No. PCT/US2014/031996, International Search Report dated Aug. 26, 2014", 3 pgs.

"International Application Serial No. PCT/US2014/031996, Written Opinion dated Aug. 26, 2014", 4 pgs.

U.S. Appl. No. 15/688,159, filed Aug. 28, 2017, Resuming Packet Services in Mobile Network.

"Chinese Application Serial No. 20140029685.0, Response filed May 3, 2018 to Office Action dated Dec. 27, 2017", w/ English Claims, 20 pgs.

"U.S. Appl. No. 15/688,159, Non Final Office Action dated Dec. 14, 2018", 15 pgs.

"Chinese Application Serial No. 201480029685.0, Office Action dated Aug. 20, 2018", W/ English Translation, 8 pgs.

(56) References Cited

OTHER PUBLICATIONS

"Chinese Application Serial No. 201480029685.0, Response filed Oct. 15, 2018 to Office Action dated Aug. 20, 2018", w/ English Claims, 19 pgs.

"Chinese Application Serial No. 201480029688.4, Office Action dated Nov. 7, 2018", w/English Translation, 27 pgs.

"Chinese Application Serial No. 201480029688.4, Response filed Aug. 13, 2018 to Office Action dated Mar. 28, 2018", w/ English Claims, 8 pgs.

"Chinese Application Serial No. 201480029688.4, Resposne Filed Jan. 22, 2019 Office Action dated Nov. 7, 2018", w/English Claims, 10 pgs.

"Chinese Application Serial No. 201480030633.5, Office Action dated Oct. 8, 2018", w/ Concise Statement of Relevance,9 pgs.

"Chinese Application Serial No. 201480030633.5, Response filed Dec. 14, 2018 to Office Action dated Oct. 8, 2018", w/ English Claims, 15 pgs.

"Chinese Application Serial No. 201480030760.5, Office Action dated Aug. 2, 2018", w/ English Translation, 8 pgs.

"Chinese Application Serial No. 201480030760.5, Response filed Oct. 8, 2018 to Office Action dated Aug. 2, 2018", w/ English Claims, 22 pgs.

"Chinese Application Serial No. 201480030839.8, Office Action dated Oct. 25, 2018", W/ English Translation, 26 pgs.

"Chinese Application Serial No. 201480030839.8, Response filed Sep. 5, 2018 to Office Action dated Feb. 23, 2018", w/ English Claims, 20 pgs.

"European Application Serial No. 14816958.4, Communication Pursuant to Article 94(3) EPC dated Oct. 23, 2018", 6 pgs.

"Korean Application Serial No. 10-2018-7012372, Notice of Preliminary Rejection dated Jul. 31, 2018", W/ English Translation, 9 pgs.

"Korean Application Serial No. 10-2018-7012372, Response filed Oct. 1, 2018 to Notice of Preliminary Rejection dated Jul. 31, 2018", w/ English Claims, 11 pgs.

"Taiwanese Application Serial No. 106129816, Response filed Aug. 20, 2018 to Office Action dated May 16, 2018", w/ English claims, 9 pgs.

"Chinese Application Serial No. 201480029685.0, Office Action dated Dec. 27, 2017", With Concise Statement of Relevance, 12 pgs.

"Chinese Application Serial No. 201480030760.5, Response filed Mar. 30, 2018 to Office Action dated Dec. 27, 2017", w/ English Claims, 19 pgs.

"European Application Serial No. 14817851.0, Response filed Oct. 2, 2017 to Extended European Search Report dated Mar. 2, 2017", 13 pgs.

"Korean Application Serial No. 2015-7033741, Office Action dated Oct. 31, 2017", With English Translation, 5 pgs.

"Chinese Application Serial No. 201480030633.5, Response filed Feb. 19, 2019 to Examiner Interview Summary dated Feb. 18, 2019", w English Claims, 23 pgs.

"Korean Application Serial No. 10-2018-7012372, Notice of Preliminary Rejection dated Feb. 27, 2019", W English Summary, 6pgs.

"Chinese Application Serial No. 201480029688.4, Decision of Rejection dated Feb. 27, 2019", w Concise Statement of Relevance, 9 pgs.

"U.S. Appl. No. 15/804,360, Non Final Office Action dated Mar. 7, 2019", 12 pgs.

"U.S. Appl. No. 15/688,159, Response filed Mar. 14, 2019 to Non Final Office Action dated Dec. 14, 2018", 7 pgs.

"U.S. Appl. No. 16/110,729, Response filed Apr. 26, 2019 to Non Final Office Action dated Feb. 19, 2019", 12 pgs.

"Korean Application Serial No. 2018-7013014, Notice of Preliminary Rejection dated Apr. 29, 2019", W English Translation, 11 pgs.

"U.S. Appl. No. 15/688,159, Notice of Allowance dated May 7, 2019", 9 pgs.

"Korean Application Serial No. 10-2018-7012372, Response filed Apr. 29, 2019 to Notice of Preliminary Rejection dated Feb. 27, 2019", w English Claims, 18 pgs.

"U.S. Appl. No. 15/688,159, Corrected Notice of Allowability dated May 23, 2019", 2 pgs.

"U.S. Appl. No. 16/110,729, Non Final Office Action dated Feb. 19, 2019", 22 pgs.

"3rd Generation Partnership Project; Technical Specification Group Radio Access Network; Evolved Universal Terrestrial Radio Access (EUTRA); Study on Small Cell Enhancements for E-UTRA and E-UTRAN—Higher layer aspects (Release)", 3GPP Standard; 3GPP TR 36.842, 3rd Generation Partnership Project (3GPP), vol. RAN WG2, No. V0.2.0, (May 2013), 38 pgs.

"U.S. Appl. No. 14/109,211, Examiner Interview Summary dated Feb. 23, 2017", 1 pg.

"U.S. Appl. No. 14/109,211, Final Office Action dated Feb. 23, 2017", 21 pgs.

"U.S. Appl. No. 14/109,211, Notice of Allowance dated May 30, 2017", 15 pgs.

"U.S. Appl. No. 14/109,211, Response filed Apr. 21, 2017 to Final Office Action dated Feb. 23, 2017", 14 pgs.

"U.S. Appl. No. 14/109,211, Response filed Dec. 9, 2016 to Non-Final Office Action dated Sep. 28, 2016", 16 pgs.

"U.S. Appl. No. 14/136,554, Examiner Interview Summary dated Feb. 17, 2017", 2 pgs.

"U.S. Appl. No. 14/136,554, Non Final Office Action dated Dec. 2, 2016", 11 pgs.

"U.S. Appl. No. 14/136,554, Notice of Allowance dated Jun. 5, 2017", 8 pgs.

"U.S. Appl. No. 14/136,554, Response filed Feb. 28, 2017 to Non Final Office Action dated Dec. 2, 2016", 8 pgs.

"U.S. Appl. No. 14/141,206, Notice of Allowance dated Dec. 12, 2016", 8 pgs.

"U.S. Appl. No. 14/141,206, Response filed Nov. 23, 2016 to Final Office Action dated Aug. 24, 2016", 9 pgs.

"U.S. Appl. No. 14/141,223, Advisory Action dated May 18, 2017", 3 pgs.

"U.S. Appl. No. 14/141,223, Final Office Action dated Jan. 3, 2017", 26 pgs.

"U.S. Appl. No. 14/141,223, Response filed May 3, 2017 to Final Office Action dated Jan. 3, 2017", 10 pgs.

"U.S. Appl. No. 14/990,054, Corrected Notice of Allowance dated May 9, 2017", 2 pgs.

"U.S. Appl. No. 14/990,054, Examiner-Initiated Interview Summary dated Mar. 29, 2017", 1 pg.

"U.S. Appl. No. 14/990,054, Notice of Allowance dated Mar. 29, 2017", 12 pgs.

"Chinese Application Serial No. 201410295081.2, Office Action dated Apr. 6, 2017", w/ English Translation, 14 pgs.

"Correction of ISR description for CSFB with suspended PS bearers", 3GPP Draft; S2-104673 23401 R10 ISR in CSFB V3. 3rd Generation Partnership Project (3GPP). Mobile Competence Centre; 650, Route Des Lucioles ; F-06921 Sophia-Antipolis Cedex ; France, vol. SA WG2. No. Prague, (Oct. 2010), 4 pgs.

"Correlation based explicit feedback", Alcatel-Lucent Shanghai Bell et al: 3GPP Draft; RI-100719, 3rd Generation Partnership Project (3GPP), Mobile Competence Centre ; 650, Route Deslucioles ; F-06921 Sophia-Antipolis Cedex ; France, (Jan. 13, 2010), 12 pgs.

"Discussion on dual RRC", 3GPP Draft; R2-131830 Dual RRC, 3rd Generation Partnership Project (3GPP), Mobile Competence Centre, (May 10, 2013), 2 pgs.

"European Application Serial No. 14816958.4, Extended European Search Report dated Feb. 3, 2017", 11 pgs.

"European Application Serial No. 14817060.8, Extended European Search Report dated Mar. 13, 2017", 12 pgs.

"European Application Serial No. 14817214.1, Extended European Search Report dated Dec. 23, 2016", 9 pgs.

"European Application Serial No. 14817448.5, Extended European Search Report dated Jun. 9, 2017", 16 pgs.

"European Application Serial No. 14817448.5, Partial Supplementary European Search Report dated Feb. 16, 2017", 11 pgs.

"European Application Serial No. 14817851.0, Extended European Search Report dated Mar. 2, 2017", 11 pgs.

(56) References Cited

OTHER PUBLICATIONS

"European Application Serial No. 14818323.9, Extended European Search Report dated Feb. 23, 2017", 10 pgs.
"Evaluation of enhanced MIMO feedbacks for LTE-A", Intel Corporation (UK) Ltd: 3GPP Draft; R1-101808_Feedback, 3rd Generation Partnership Project (3GPP), Mobile Competence Centre ; 650, Route Des Lucioles ; F-06921 Sophia-Antipolis Cedex ; France, (Apr. 6, 2010), 1-3,5.
"Evaluation results for feedback enhancement (Scenario A and C)", LG Electronics: 3GPP Draft; RI-114351 LG Evaluation Results SCNAC, 3rd Generation Partnership Project (3GPP), Mobile Competence Centre ; 650, Route Des Lucioles ; F-06921 Sophia-Antipolis Cedex ; France, vol. RAN WG1, No. San Francisco, USA, (Nov. 21, 2011), 8 pgs.
"Generalized Transformation for adaptive codebooks", Samsung: 3GPP Draft; RI-102204 Adaptive Codebook Rev1, 3rd Generation Partnership Project I3GPP), Mobile Competence Centre 650, Route Deslucioles ; F-06921 Sophia-Antipolis Cedex ; France, vol. RAN WG1, No. Beijing , China;, (Apr. 6, 2010), 10 pgs.
"Impact of small cell enhancements to RRC functions", 3GPP TSG-RAN WG2 Meeting #82, R2-131672, (May 24, 2013), 6 pgs.
"Japanese Application Serial No. 2016-521919, Office Action dated Jan. 31, 2017", W/ English Translation, 4 pgs.
"Korean Application Serial No. 10-2015-7033288, Office Action dated Dec. 1, 2016", w/ English Translation, 10 pgs.
"Korean Application Serial No. 10-2015-7033288, Response filed Feb. 1, 2017 to Office Action dated Dec. 1, 2016", w/ English Claims, 14 pgs.
"Korean Application Serial No. 2015-7033741, Office Action dated Mar. 18, 2017", With English Translation, 9 pgs.
"Korean Application Serial No. 2015-7033741, Response filed May 18, 2017 to Office Action dated Mar. 18, 2017", w/ English Claims, 26 pgs.
"On the remaining aspects of PMI and RI reporting accuracy tests fo r eDL-MIMO", Qualcomm Incorporated: 3GPP Draft; R4-114211, 3rd Generation Partnership Project (3GPP), Mobile Competence Centre ; 650, Route Deslucioles ; F-06921 Sophia-Antipolis Cedex ; France, vol. RAN WG4, No. Athens, Greece, (Aug. 17, 2011), 4 pgs.
"RA update after Cell Change Order (CCO) to GERAN", 3GPP Draft; S2-123292 WASS2-122780 RA Update After Cell Change Order (CCO) to GERAN. 3rd Generation Partnership Project (3GPP). Mobile Competence Centre; 650. Route Des Lucioles ; F-06921 Sophia-Anti, vol. SA WG2. No. Barcelona. Spain, Retrieved from the Internet: URL:http://www.3gpp.org/ftpjtsg_sajWG2_Arch/TSGS2_92_Barcelona/Docs/ [retrieved-on Jul. 12, 2012], (Jul. 2012), 3 pgs.
"Reply LS on UE's inconsistent behaviour when PS Back-off timer is running", 3GPP TSG-CT WG1?83 C1-131808, [Online] retrieved from the internet: <http://www.3gpp.org/ftp/tsg_ct/WG1_mm-cc-sm_ex-CN1/TSGC1_83_Chengdu/docs/C1-131808.zip>, (May 2, 2013), 1 pg.
"SU/MU MIMO Feedback with Codebook-based Vector Quantization", Samsung: 3GPP Draft; RI-094322 SUMU MIMO Feedback With Codebook-Based Vector Quantization, 3rd Generation Partnership Project (3GPP), Mobile Competence Centre ; 650, Route Des Lucioles ; F-06921 Sophia-Antipolis Cedex ; France, (Oct. 7, 2009), 9 pgs.
"Taiwanese Application Serial No. 105119738, Office Action dated Jan. 24, 2017", (English Translation), 23 pgs.
"Techniques for D2D Discovery", R1-132503, 3GPP TSG RAN WG1 Meeting #73, (May 2013), 1-7.
Alcatel-Lucent, et al., "Grid of beams for MU-MIMO", 3GPP Draft; RI-100421 GOB, 3rd Generation Partnership Project (3GPP), Mobile Competence Centre ; 650, Route Deslucioles ; F-06921 Sophia-Antipolis Cedex; France, vol. RAN WG1, No. Valencia, Spain, (Jan. 12, 2010), 6 pgs.
Alcatel-Lucent, Shanghai Bell, et al., "Considerations on CSI feedback enhancements fo r high-priority antenna configurations", 3GPP Draft; RI-112420 Considerations on CSI Feedback Enhancements for High-Priority Antenna Configurat1ons_Clean, 3rd Generation Partnership Project (3GPP), Mobile Competence Centre ; 650, Route Deslucioles, (Aug. 18, 2011), 7 pgs.
NTT Docomo, "Initial Views on Unified Approach for D2D Discovery", 3GPP Draft; R1-132371 D2D Discovery Unified. 3rd Generation Partnership Project (3GPP), Retrieved from the Internet: <URL:http://www.3gpp.org/ftpjtsg ran/WG1 RL1/TSGR1 73/Docs/>, (May 11, 2013), 7 pgs.
"U.S. Appl. No. 14/109,211, Advisory Action dated Aug. 22, 2016", 5 pgs.
"U.S. Appl. No. 14/109,211, Final Office Action dated Jun. 10, 2016", 17 pgs.
"U.S. Appl. No. 14/109,211, Non Final Office Action dated Sep. 28, 2016", 18 pgs.
"U.S. Appl. No. 14/109,211, Non Final Office Action dated Dec. 14, 2015", 15 pgs.
"U.S. Appl. No. 14/109,211, Response filed Aug. 5, 2016 to Final Office Action dated Jun. 10, 2016", 9 pgs.
"U.S. Appl. No. 14/109,211, Response filed Sep. 12, 2016 to Advisory Action dated Aug. 22, 2016", 9 pgs.
"U.S. Appl. No. 14/109,211,Response filed Mar. 14, 2016 to Non Final Office Action dated Dec. 14, 2015", 21 pgs.
"U.S. Appl. No. 14/136,554, Advisory Action dated Dec. 8, 2015", 3 pgs.
"U.S. Appl. No. 14/136,554, Examiner Interview Summary dated Dec. 1, 2015", 3 pgs.
"U.S. Appl. No. 14/136,554, Final Office Action dated Sep. 21, 2015", 12 pgs.
"U.S. Appl. No. 14/136,554, Non Final Office Action dated Mar. 17, 2015", 11 pgs.
"U.S. Appl. No. 14/136,554, Response filed Jun. 17, 2015 to Non Final Office Action dated Mar. 17, 2015", 6 pgs.
"U.S. Appl. No. 14/136,554, Response filed Nov. 24, 2015 to Final Office Action dated Sep. 21, 2015", 6 pgs.
"U.S. Appl. No. 14/141,067, Non Final Office Action dated Jul. 8, 2015", 9 pgs.
"U.S. Appl. No. 14/141,067, Notice of Allowance dated Dec. 10, 2015", 9 pgs.
"U.S. Appl. No. 14/141,067,Response filed Oct. 8, 2015 Non Final Office Action dated Jul. 8, 2015", 9 pgs.
"U.S. Appl. No. 14/141,206, Advisory Action dated Aug. 19, 2015", 4 pgs.
"U.S. Appl. No. 14/141,206, Applicant's Summary of Examiner Interview filed Sep. 15, 2015", 1 pg.
"U.S. Appl. No. 14/141,206, Examiner Interview Summary dated Jan. 25, 2016", 3 pgs.
"U.S. Appl. No. 14/141,206, Examiner Interview Summary dated Aug. 26, 2015", 3 pgs.
"U.S. Appl. No. 14/141,206, Final Office Action dated May 15, 2015", 13 pgs.
"U.S. Appl. No. 14/141,206, Final Office Action dated Aug. 24, 2016", 9 pgs.
"U.S. Appl. No. 14/141,206, Non Final Office Action dated Jan. 7, 2016", 12 pgs.
"U.S. Appl. No. 14/141,206, Non Final Office Action dated Dec. 3, 2014", 13 pgs.
"U.S. Appl. No. 14/141,206, Response filed Apr. 2, 2015 to Non Final Office Action dated Dec. 3, 2014", 12 pgs.
"U.S. Appl. No. 14/141,206, Response filed May 6, 2016 to Non Final Office Action dated Jan. 7, 2016", 11 pgs.
"U.S. Appl. No. 14/141,206, Response filed Aug. 11, 2015 to Final Office Action dated May 15, 2015", 12 pgs.
"U.S. Appl. No. 14/141,223, Advisory Action dated Dec. 11, 2015", 4 pgs.
"U.S. Appl. No. 14/141,223, Examiner Interview Summary dated Dec. 2, 2015", 3 pgs.
"U.S. Appl. No. 14/141,223, Final Office Action dated Oct. 7, 2015", 19 pgs.
"U.S. Appl. No. 14/141,223, Non Final Office Action dated Apr. 14, 2015", 18 pgs.
"U.S. Appl. No. 14/141,223, Non Final Office Action dated Jul. 28, 2016", 18 pgs.
"U.S. Appl. No. 14/141,223, Response filed Aug. 12, 2015 to Non Final Office Action dated Apr. 14, 2015", 11 pgs.

(56) References Cited

OTHER PUBLICATIONS

"U.S. Appl. No. 14/141,223, Response filed Oct. 28, 2016 to Non Final Office Action dated Jul. 28, 2016", 8 pgs.
"U.S. Appl. No. 14/141,223, Response filed Dec. 2, 2015 to Final Office Action dated Oct. 7, 2015", 8 pgs.
"U.S. Appl. No. 14/990,054, Preliminary Amendment filed Jan. 11, 2016", 7 pgs.
"Circuit Switched (CS) fallback in Evolved Packet System (EPS); Stage 2", 3GPP TS 23.272 V11.5.0. Technical Specification Group Services and System Aspects. Release 11., (Jun. 2013), 95 pgs.
"Clarification on the scope of ISRP Filter Rule priority", LG Electronics, S2-115168, 3GPP TSG-SA2 Meeting #88, (Nov. 2011), 1-4.
"European Application Serial No. 14171648.0, Extended European Search Report dated Dec. 22, 2014", 7 pgs.
"European Application Serial No. 14171648.0, Response filed Jul. 17, 2015 Extended European Search Report dated Dec. 22, 2014", 8 pgs.
"Evolved Universal Terrestrial Radio Access (E-UTRA); Multiplexing and channel coding", 3GPP TS 36.212 V12.0.0. Technical Specification Group Radio Access Network. Release 12., (Dec. 2013), 88 pgs.
"Evolved Universal Terrestrial Radio Access (E-UTRA); Multiplexing and channel coding", ETSI TS 136 212 V11.3.0 (3GPP TS 36.212 version 11.3.0 Release 11). LTE., (Jul. 2013), 86 pgs.
"Evolved Universal Terrestrial Radio Access (E-UTRA); Physical channels and modulation", 3GPP TS 36.211 V12.0.0. Technical Specification Group Radio Access Network. Release 12., (Dec. 2013), 120 pgs.
"Evolved Universal Terrestrial Radio Access (E-UTRA); Physical channels and modulation", ETSI TS 136 211 v11.3.0 (3GPP TS 36.211 version 11.3.0 Release 11). LTE, (Jul. 2013), 110 pgs.
"Evolved Universal Terrestrial Radio Access (E-UTRA); Physical layer procedures", 3GPP TS 36.213 V12.0.0. Technical Specification Group Radio Access Network. Release 12., (Dec. 2013), 186 pgs.
"Evolved Universal Terrestrial Radio Access (E-UTRA); Physical layer procedures", ETSI TS 136 213 V11.3.0 (3GPP TS 36.213 version 11.3.0 Release 11). LTE., (Jul. 2013), 178 pgs.
"Evolved Universal Terrestrial Radio Access (E-UTRA); Study on Small Cell Enhancements for E-UTRA and E-UTRAN—Higher layer aspects", 3GPP TR 36.842 V1.0.0. Technical Specification Group Radio Access Network. Release 12., 69 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 28-32.
"General Packet Radio Service (GPRS); Service description; Stage 2", 3GPP TS 23.060 V12.1.0. Technical Specification Group Services and System Aspects. Release 12., (Jun. 2013), 338 pgs.
"IEEE Standard for Air Interface for Broadband Wireless Access Systems", IEEE Std 802.16. IEEE Computer Society. IEEE Microwave Theory and Techniques Society., (Aug. 17, 2012), 2544 pgs.
"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.
"International Application Serial No. PCT/US2014/031996, International Preliminary Report on Patentability dated Jan. 7, 2016", 6 pgs.
"International Application Serial No. PCT/US2014/044540, International Preliminary Report on Patentability dated Jan. 7, 2016", 8 pgs.
"International Application Serial No. PCT/US2014/044540, International Search Report dated Oct. 15, 2014", 3 pgs.
"International Application Serial No. PCT/US2014/044540, Written Opinion dated Oct. 15, 2014", 6 pgs.
"International Application Serial No. PCT/US2014/044592, International Preliminary Report on Patentability dated Jan. 7, 2016", 7 pgs.
"International Application Serial No. PCT/US2014/044592, International Search Report dated Sep. 29, 2014", 3 pgs.
"International Application Serial No. PCT/US2014/044592, Written Opinion dated Sep. 29, 2014", 5 pgs.
"International Application Serial No. PCT/US2014/044606, International Preliminary Report on Patentability dated Jan. 7, 2016", 16 pgs.
"International Application Serial No. PCT/US2014/044606, International Search Report dated Oct. 22, 2014", 3 pgs.
"International Application Serial No. PCT/US2014/044606, Written Opinion dated Oct. 22, 2014", 6 pgs.
"International Application Serial No. PCT/US2014/044626, International Preliminary Report on Patentability dated Jan. 7, 2016", 7 pgs.
"International Application Serial No. PCT/US2014/044626, International Search Report dated Oct. 22, 2014", 3 pgs.
"International Application Serial No. PCT/US2014/044626, Written Opinion dated Oct. 22, 2014", 5 pgs.
"International Application Serial No. PCT/US2014/044640, International Preliminary Report on Patentability dated Jan. 7, 2016'", 8 pgs.
"International Application Serial No. PCT/US2014/044640, International Search Report dated Oct. 21, 2014", 4 pgs.
"International Application Serial No. PCT/US2014/044640, Written Opinion dated Oct. 21, 2014", 6 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"Part 11: Wireless LAN Medium Access Control (MAC) and Physical Layer (PHY) Specifications: Amendment 3: Enhancements for Very High Throughput in the 60 GHz Band", IEEE Std 802.11ad. (Amendment to IEEE Std 802.11™-2012, as amended by IEEE Std 802.11ae™-2012 and IEEE Std 802.11aa™-2012), (Dec. 28, 2012), 628 pgs.
"Taiwanese Application Serial No. 103120032, Office Action dated Sep. 23, 2015", W/ English Translation, 14 pgs.
"Taiwanese Application Serial No. 103120032, Response filed Dec. 16, 2015 to Office Action dated Sep. 23, 2015", W/ English Claims, 17 pgs.
"Taiwanese Application Serial No. 103121919, Office Action dated Dec. 17, 2015", W/ English Search Report, 10 pgs.
"Taiwanese Application Serial No. 103121919, Response filed Jun. 20, 2016 to Office Action dated Dec. 17, 2015", W/ English Translation of Claims, 64 pgs.
Delmas, Jean P, "Chapter 4: Subspace Tracking for Signal Processing", Adaptive Signal Processing: Next Generation Solutions, John Wiley & Sons, Inc., (Jun. 16, 2010), 211-270.
Shirani-Mehr, Hooman, et al., "Practical Downlink Transmission Schemes for Future LTE Systems with Many Base-Station Antennas", IEEE Globecom, (2013), 5 pgs.
Yang, Bang, "Projection approximation subspace tracking", IEEE Transactions on Signal Processing, 43(1), (Jan. 1995), 95-107.
"U.S. Appl. No. 15/804,360, Response filed Jun. 5, 2019 to Non Final Office Action dated Mar. 7, 2019", 10 pgs.
"Korean Application Serial No. 2018-7013014, Response filed Jun. 28, 2019 to Notice of Preliminary Rejection dated Apr. 29, 2019", w English Claims, 24 pgs.
"U.S. Appl. No. 15/804,360, Final Office Action dated Aug. 8, 2019", 11 pgs.
"Indian Application Serial No. 7142 CHENP 2015, First Examination Report dated Mar. 13, 2019", w English Translation, 5 pgs.
Indian Application Serial No. 7142 CHENP 2015, Response filed Sep. 13, 2019 to First Examination Report dated Mar. 13, 2019, w English Translation, 27 pgs.

(56) References Cited

OTHER PUBLICATIONS

U.S. Appl. No. 14/141,067 U.S. Pat. No. 9,320,063, filed Dec. 26, 2013, Resuming Packet Services in a Mobile Network.
U.S. Appl. No. 14/990,054, filed Jan. 7, 2016, Resuming Packet Services in a Mobile Network.
U.S. Appl. No. 14/109,211, filed Dec. 17, 2013, Method for Efficient Channel Estimation and Beamforming in FDD System by Exploiting Uplink-Downlink Correspondence.
U.S. Appl. No. 14/141,206, filed Dec. 26, 2013, Subspace Tracking in Full Dimension MIMO.
U.S. Appl. No. 14/141,223, filed Dec. 26, 2013, Aligning Radio Resource Control Parameters in Small Cell Deployments.
U.S. Appl. No. 14/136,554, filed Dec. 20, 2013, User Equipment and Method for User Equipment Feedback of Flow-to-Rat Mapping Preferences.

\* cited by examiner

TYPE 1 INTRA-SUBFRAME D2D DISCOVERY HOPPING

TYPE 1 INTER-SUBFRAME D2D DISCOVERY HOPPING

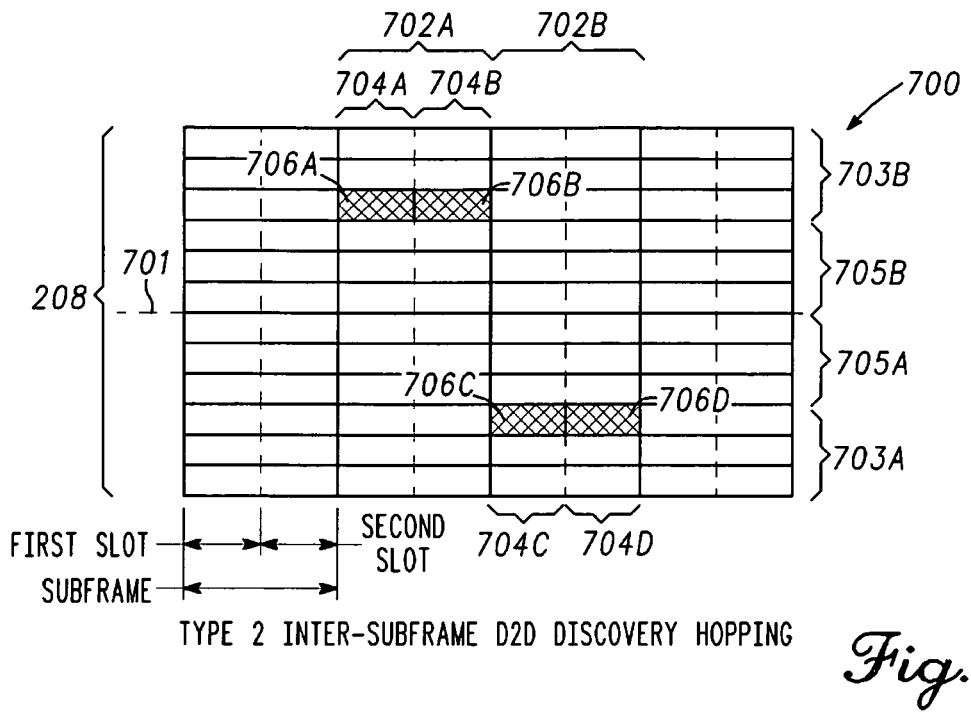
Fig. 7 — TYPE 2 INTER-SUBFRAME D2D DISCOVERY HOPPING
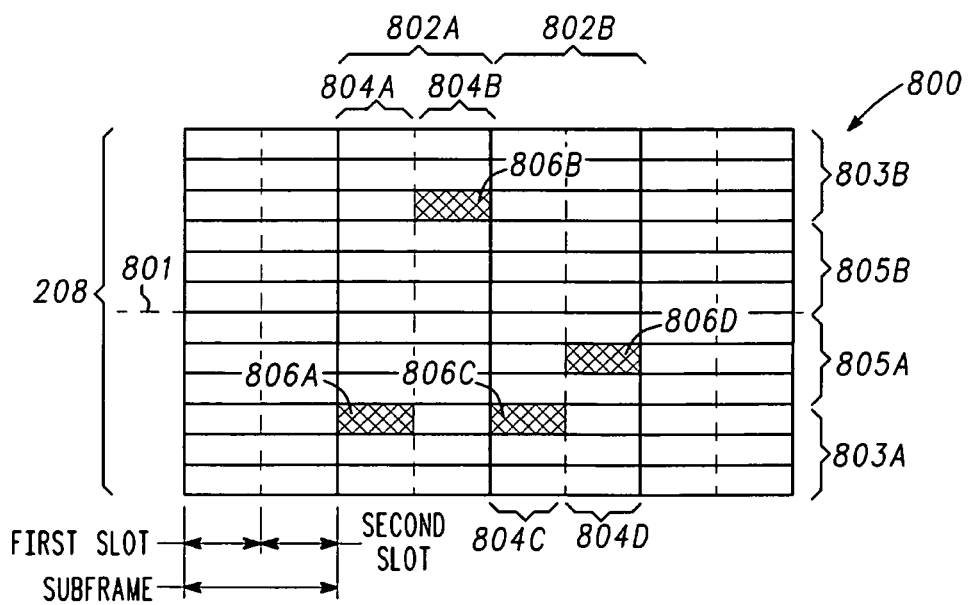
Fig. 8 — TYPE 2 JOINT INTRA/INTER SUBFRAME D2D DISCOVERY HOPPING

USER EQUIPMENT AND METHOD FOR RESOURCE ALLOCATION AND DEVICE-TO-DEVICE DISCOVERY HOPPING

PRIORITY CLAIM

This application is a U.S. National Stage Filing under 35 U.S.C. 371 from International Application No. PCT/US2014/031996, filed Mar. 27, 2014 and published in English as WO 2014/209451 on Dec. 31, 2014, which claims the benefit of priority to U.S. Provisional Patent Application Ser. No. 61/841,230, filed Jun. 28, 2013, each of which is incorporated herein by reference in its entirety.

TECHNICAL FIELD

Embodiments pertain to wireless communications. Some embodiments relate to 3GPP LTE (Long Term Evolution) networks. Some embodiments relate to direct device-to-device (D2D) communication. Some embodiments relate to direct device-to-device (D2D) communication in LTE networks.

BACKGROUND

Support for direct D2D communication as an integrated part of a wireless communication system is currently being considered for the further evolution of LTE networks. With direct D2D communication, user equipment (UE) may communicate directly with each other without involvement of a base station or an enhanced node B (eNB). One issue with D2D communication is device discovery to enable D2D service. Device discovery involves discovering one or more other discoverable UEs within communication range for D2D communication. Device discovery also involves being discovered by one or more other discovering UEs within communication range for D2D communication. There are many unresolved issues with respect to device discovery for D2D communication including resource allocation for device discovery.

Thus there are general needs for UEs and methods for device discovery for D2D communication in LTE networks. There are also general needs for UEs and methods for resource allocation for device discovery for D2D communication in LTE networks

BRIEF DESCRIPTION OF THE DRAWINGS

FIG. 7 illustrates Type 2 inter-subframe D2D discovery hopping in accordance with some embodiments;

FIG. 8 illustrates Type 2 joint intra/inter-subframe D2D discovery hopping in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
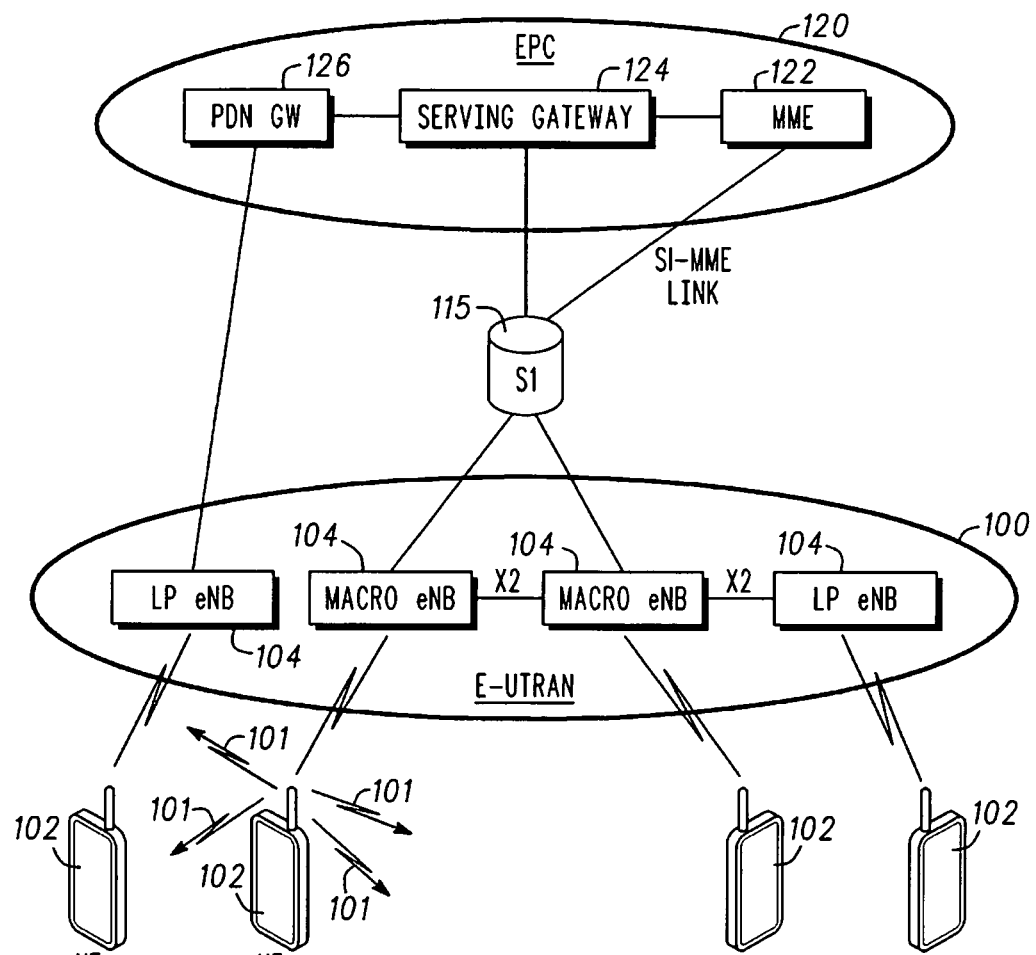
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

In accordance with some embodiments, the UEs 102 may be arranged for device-to-device (D2D) communications including D2D discovery of other UEs 102 for direct D2D communication. These embodiments are discussed in more detail below.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In accordance with some embodiments, a UE 102 that is configured for D2D discovery operations may receive signaling from an eNB 104. The signaling may indicate a discovery zone within an LTE operation zone. The LTE operation zone may comprise a plurality of physical resource blocks (PRBs) and the discovery zone may comprise PRBs within the LTE operation zone. A UE 102 may transmit a discovery signal 101 for receipt by one or more other UEs 102 (i.e., for D2D discovery) within a plurality of physical resource blocks (PRBs) of the discovery zone. The PRBs for transmission of the discovery signal 101 may be determined in accordance with a hopping mode to provide increased frequency diversity within the bandwidth of the discovery zone. In these embodiments, the hopping mode may comprise intra-subframe hopping, inter-subframe hopping or joint intra/inter-subframe hopping. These embodiments are described in more detail below.

The increased frequency diversity provided by discovery hopping may help the discovery signal 101 to be received by other UEs 102. In some embodiments, the discovery signal 101 may comprise a discovery packet. In other embodiments, the discovery signal may comprise a discovery sequence. In some embodiments, the discovery signal 101 may comprise one or more discovery packets which may include a payload with discovery information. The discovery information may be used to identify the transmitting UE 102. The discover information may indicate that the transmitting UE 102 wishes to be discovered or may indicate that the transmitting UE 102 wishes to discover other UEs. In some embodiments, device discovery may include proximity detection.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information is sent to a UE on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
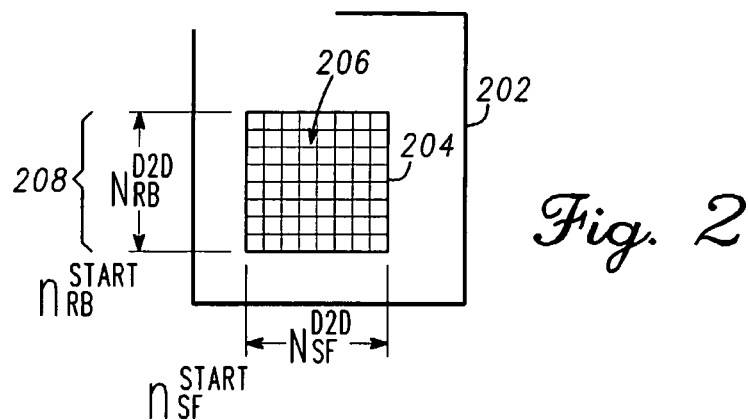
FIG. 2 shows a structure for a resource grid for communications in a network, such as the LTE network of FIG. 1, in accordance with some embodiments.

FIG. 2 shows a structure for a resource grid for communications in a network, such as the LTE network of FIG. 1, in accordance with some embodiments. The depicted grid is a time-frequency grid, called a resource grid, which is the physical resource in the downlink or uplink in each slot. The smallest time-frequency unit in a resource grid is denoted as a resource element (RE). The resource grid comprises a number of resource blocks (RBs), which describe the mapping of certain physical channels to resource elements. Each resource block comprises a collection of resource elements and in the frequency domain, represents the smallest quanta of resources that currently can be allocated. There are several different physical channels that are conveyed using such resource blocks. The resource grid illustrated in FIG. 2 may comprise an LTE operation zone 202 which may comprise a plurality of PRBs for use by the RAN 100.

In accordance with some embodiments, a UE 102 (FIG. 1) may receive signaling from an eNB 104 indicating a discovery zone 204 within the LTE operation zone 202. The discovery zone 204 may comprises a plurality of PRBs. The UE 102 may transmit a discovery signal 101 (FIG. 1) for receipt by one or more other UEs 102 (FIG. 1) for D2D discovery within some PRBs 206 of the discovery zone 204. As discussed above, the PRBs 206 for transmission of the discovery signal 101 may be determined in accordance with a hopping mode which may provide increased frequency diversity within the bandwidth 208 of the discovery zone 204. This may improve the chances of discovering other UEs and well as being discovered by other UEs. In some embodiments, device discovery may include proximity detection.

In accordance with embodiments, a PRB may be associated with a particular slot of a subframe in the time dimension and a particular group of frequency subcarriers in the frequency dimension. Each PRB, for example, may be identified by a RB index and a subframe index. In some embodiments, a discovery signal 101 may be transmitted within M subframes of N resources blocks where M and N are at least one and can be greater than one. These embodiments are described in more detail below.

In some embodiments, a PRB may comprise 12 sub-carriers in the frequency domain by 0.5 ms (one slot) in the time domain. The PRBs may be allocated in pairs (in the time domain), although this is not a requirement. In some embodiments, the PRB may comprise a plurality of resource elements (REs). A RE may comprise one sub-carrier by one symbol. When a normal CP is used, the resource block contains seven symbols. When an extended CP is used, the resource block contains six symbols. A delay spread that exceeds the normal CP length indicates the use of extended CP. Each subframe may be 1 ms and one frame may comprise ten such subframes.

There are two different approaches in D2D discovery: restricted/closed D2D discovery and open D2D discovery. Restricted/closed D2D discovery applies to use cases wherein a discoverable device may be discovered only by a select set of ProSe enabled discovering devices. A further implication of closed device discovery is consideration of scenarios wherein a discovering device tries to discover particular ProSe enabled device(s) (one or many from a set of ProSe enabled devices). Thus, for this use case, a discovering device would be assumed to know the ProSe enabled device it wishes to discover in its proximity.

Contrary to closed D2D discovery, open device discovery considers use cases wherein a discoverable device may want itself to be discovered by all ProSe enabled devices in its proximity. From the perspective of the discovering device, open device discovery implies that a discovering device may not be assumed to be aware of the identity of other ProSe enabled devices prior to discovery. Consequently, the device discovery mechanism for open discovery should aim towards discovering as many ProSe enabled devices in its proximity as possible.

Embodiments disclosed herein provide resource allocation mechanisms and hopping designs are may be applied for both restricted/close and open D2D discovery. Open D2D discovery is used in the various examples discussed below. For open D2D discovery, an eNB 104 may have a limited control on the discovery process among the UEs 102. In particular, an eNB 104 may periodically allocate certain discovery resources in the form of D2D discovery zones 204 for a UE 102 to transmit discovery information. As mentioned above, the discovery information may be in the form of a discovery signal (e.g., a discovery sequence or discovery packet with payload information). The examples described below are described with respect to a discovery packet with payload information. The discovery related information that UEs 102 may intend to share with each other may include a unique ID for device identification, a service identity, etc. (e.g., 48 bits or more) as the data payload, which may be protected by a cyclic-redundancy check (CRC). The number of resource blocks for discovery packet transmission in open D2D discovery design, which is denoted as $L_{RB}^{D2D}$, can be one or more, depending on the payload size and the overall discovery performance requirements.

In the examples illustrated below, the discovery zones 204 may be periodic discovery zones with each discovery zone comprising some RBs in the frequency domain and several subframes in time domain. In FIG. 2 $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of the D2D discovery zones (such as discover region 204) may be semi-statically signaled by the eNB 104 using radio-resource control (RRC) signaling or by system information blocks (SIBs) for within network coverage scenarios. For a partial network coverage scenario, such information can be forwarded by an in-network coordinator UE to a UE that may be outside network coverage.

For open D2D discovery, a UE 102 configured for D2D communication may randomly choose the subframe index and starting RB index within the discovery zone 204 to transmit a discovery packet. To increase the frequency diversity benefits, embodiments disclosed herein provide several options of hopping patterns for D2D discovery. One option is Type 1 D2D discovery hopping which utilizes an explicit hopping pattern. Another option is Type 2 D2D discovery hopping which uses a subband hopping and mirroring technique. These embodiments are described in more detail below.

In addition, a hopping mode may be based on intra-subframe hopping or inter-subframe hopping. Selection between intra-subframe and inter-subframe hopping may be provided by higher layer in a cell-specific manner as for the discovery zone information. Type 1 and Type 2 D2D discovery hopping for the various hopping modes are described in more detail below.

In accordance with some embodiments, a UE 102 may be configured for either Type 1 hopping or Type 2 hopping in accordance with one of the hopping modes. When configured for Type 1 hopping, the UE 102 may be configured to use an explicit hopping pattern to determine the PRBs for the transmission of the discovery signal 101. When configured for Type 2 hopping, the UE 102 may be configured to use a subband hopping and mirroring technique to determine the PRBs for the transmission of the discovery signal 101.

Figure 3:
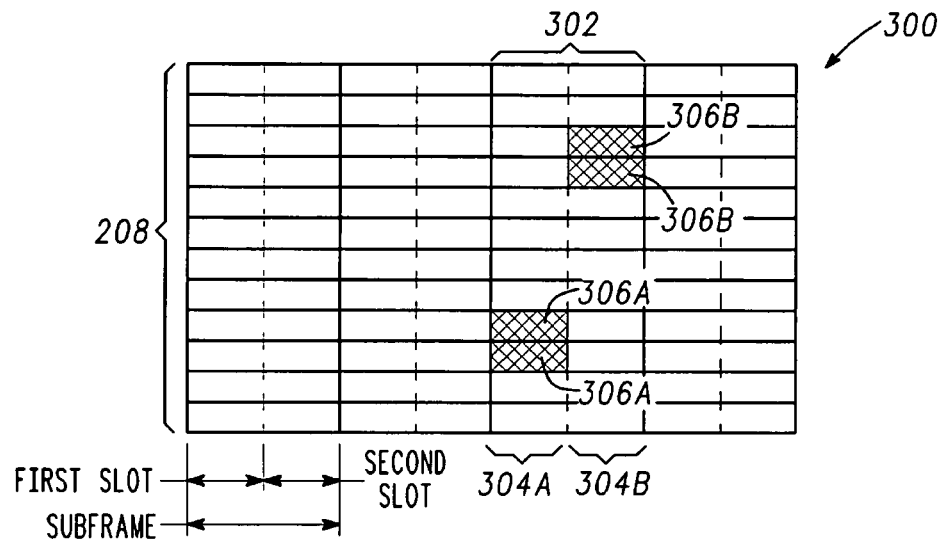
FIG. 3 illustrates Type 1 intra-subframe D2D discovery hopping in accordance with some embodiments.
Figure 4:
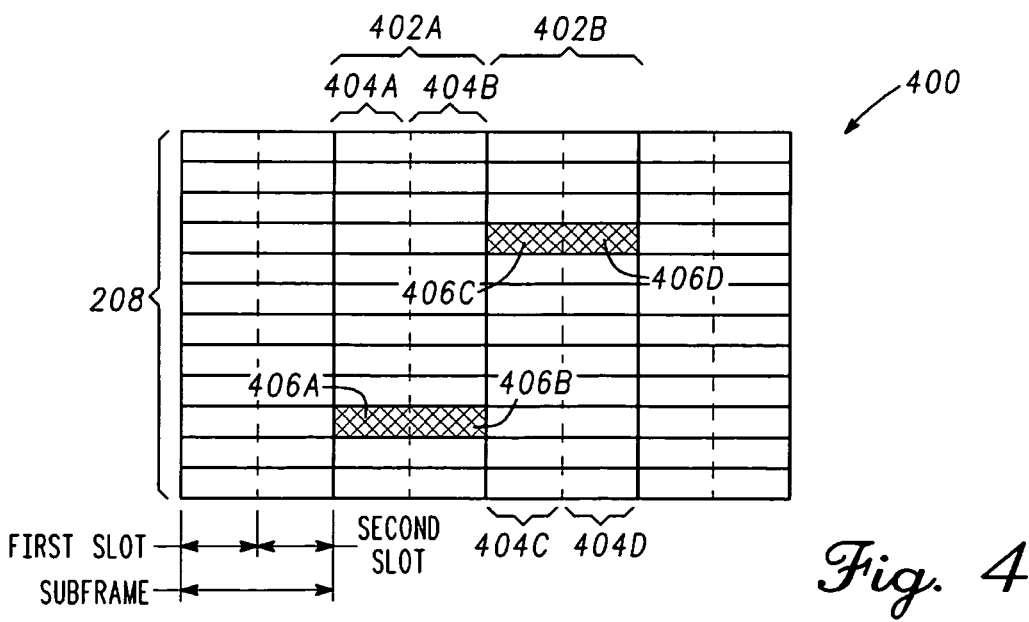
FIG. 4 illustrates Type 1 inter-subframe D2D discovery hopping in accordance with some embodiments.
Figure 5:
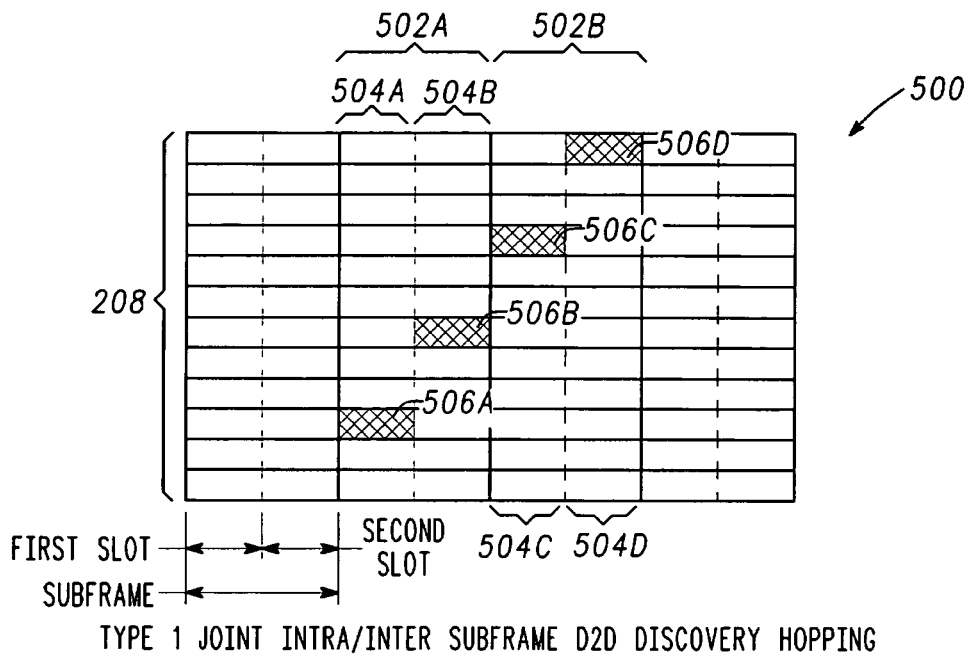
FIG. 5 illustrates Type 1 joint intra/inter-subframe D2D discovery hopping in accordance with some embodiments.

In some embodiments, the use of an explicit hopping pattern may be referred to as Type 1 hopping. Type 1 hopping may include Type 1 intra-subframe hopping, Type 1 inter-subframe hopping and Type 1 joint intra/inter-subframe hopping. Some examples of Type 1 hopping are illustrated in FIGS. 3 through 5 described in more detail below.

Figure 6:
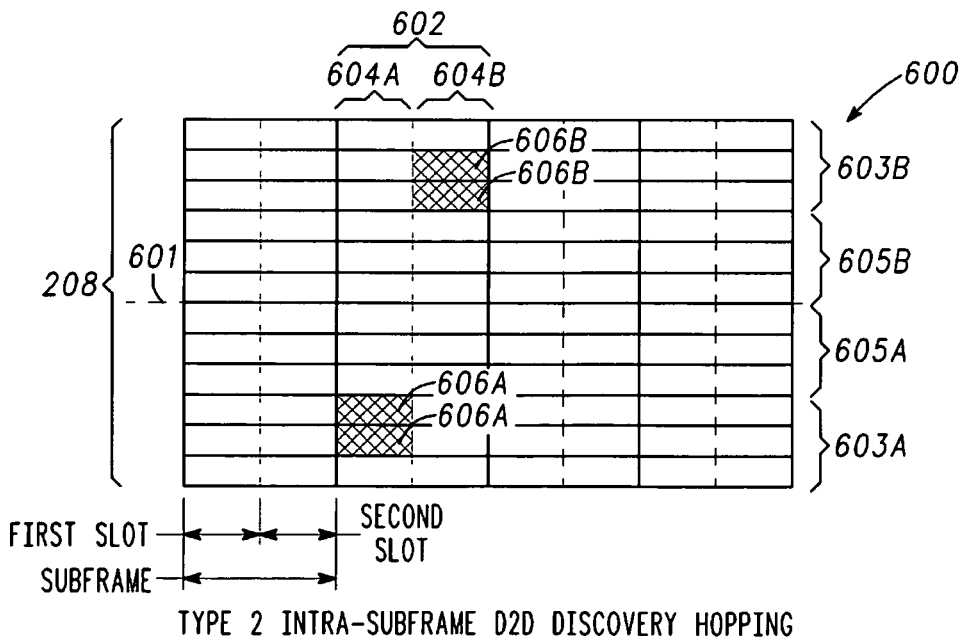
FIG. 6 illustrates Type 2 intra-subframe D2D discovery hopping in accordance with some embodiments.

In some embodiments, the use of a subband hopping and mirroring technique may be referred to as Type 2 hopping. Type 2 hopping may include Type 2 intra-subframe hopping, Type 2 inter-subframe hopping and Type 2 joint intra/inter-subframe hopping. Some examples of Type 2 hopping are illustrated in FIGS. 6 through 8 described in more detail below.

In some embodiments, the UE 102 may be configured for either open D2D discovery or closed D2D discovery. When configured for closed D2D discovery, an initial subframe within the discovery zone 204 may be assigned by the eNB 102 for transmission of the discovery signal 101. When configured for open D2D discovery, an initial subframe with the discovery zone 204 may be selected (e.g., randomly) by the UE 102 for transmission of the discovery signal 101. In some embodiments when configured for open D2D discovery the initial subframe with the discovery zone 204 may be randomly selected by the UE 102 for transmission of the discovery signal 101, although the scope of the embodiments is not limited in this respect.

In some embodiments, when hopping for D2D discovery is enabled, the discovery signal 101 may be transmitted within the determined PRBs 206 in accordance with the hopping mode. When hopping for D2D discovery is not enabled, the UE 102 may be arranged to transmit the discovery signal 101 over consecutive RB pairs within one subframe and/or spread over a set of consecutive subframes with a same RB index (i.e., without hopping) depending on the configuration of the discovery zone 204 (e.g., number of PRBs and number of subframes). In some embodiments, the signaling received from the eNB 104 indicating the discovery zone 204 may be either semi-statically signaled using RRC signaling or may be provided in one or more system-information blocks (SIBs). In some embodiments, the discovery zone 204 may comprise one of a plurality of periodic discovery zones (i.e., discovery zones that occur periodically). In some embodiments, the same discovery zone 204 may be provided to UEs in multiple cells for inter-cell D2D discovery.

In some embodiments, a UE 102 may be configurable by the eNB 104 for either Type 1 D2D discovery or Type 2 D2D discovery. When configured for Type 1 D2D discovery, resources (e.g., of the PUSCH) for transmission of the discovery signal 101 may be allocated by the eNB 104 on a non-UE specific basis. When configured for Type 2 D2D discovery, specific resources for transmission of the discovery signal 101 may be allocated by the eNB 104 to the UE 102 for transmission of the discovery signal. In these embodiments, for Type 1 D2D discovery, resources (i.e., PRBs) for transmission of the discovery signal 101 may be allocated on a non-UE specific basis. These allocated resources may be used by all UEs or a particular group of UEs for discovery. For Type 2 D2D discovery, the resources for transmission of the discovery signal 101 may be allocated on a per UE specific basis. Type 2 D2D discovery may include either Type 2A D2D discovery or Type 2B D2D discovery. For Type 2A D2D discovery, resources (i.e., PRBs) for transmission of a discovery signal 101 may be allocated to a UE for each specific transmission instance of the discovery signal 101. For Type 2B D2D discovery, resources for transmission of a discovery signal 101 may be semi-persistently allocated for transmission of a discovery signal 101. In these embodiments of Type 2 D2D discovery, the specific channel resources (i.e., PRBs) may be assigned by the eNB 104 or signaled in some manner (e.g., for an outside network scenario).

In accordance with these embodiments, a UE 102 that is configured for Type 1 D2D discovery may be configured for either Type 1 hopping or Type 2 hopping. A UE 102 that is configured for Type 2 D2D discovery may also be configured for either Type 1 hopping or Type 2 hopping.

In some embodiments, the UE 102 is arranged to receive signaling from an eNB 104 indicating discovery resources within an LTE operation zone. The discovery resources may comprise a plurality of PRBs. The UE 102 may transmit a discovery signal for receipt by one or more other UEs for D2D discovery within at least some PRBs of the discovery resources. The PRBs for transmission of the discovery signal may be in accordance with a hopping mode and may provide increased frequency diversity within a bandwidth of the discovery zone. In some embodiments, when the signaling from the eNB indicates that the discovery resources comprise a discovery zone 204, the UE may be arranged to determine the PRBs for transmission of the discovery signal within the discovery zone 104 in accordance with the hopping mode. In some embodiments, the signaling from the eNB 104 may indicate a discovery period. In some embodiments, the signaling from the eNB 104 may indicate the exact resources to transmit discovery signals on.

For the outside and partial network coverage scenarios, such information can be forwarded by the coordinator UE to the UEs that are outside network coverage. In these embodiments, for UEs that are outside the network coverage region, the configuration details for the D2D discovery zone may be either pre-configured, or relayed by a UE within network coverage, or the configuration details be configured by another UE outside network coverage. In some embodiments, a pool of resources constituting the discovery zone may be associated with or configured by the synchronization source or any other coordinator UE. In these embodiments, a UE may either be in a partial network coverage scenario if, for example, there is a presence of a network close by and it can communicate with and/or discover other UEs that are within network coverage, or fully outside network coverage.

For partial network coverage scenarios, discovery resources may be configured by an eNB and being relayed by another UE (e.g., a coordinator UE) that is within network coverage (and so, within operation zone of the network). For outside network coverage case, a specific spectrum may be allocated, although the scope of the embodiments is not limited in this respect. Once a UE determines that it is not under any network coverage or cannot detect synchronization signals that have originated from the network, the UE may search for synchronization signals on certain pre-configured spectrum band(s) for synchronization signals that may be transmitted by other UEs (i.e., not originating from an eNB 104), and for the latter case, the resources may be associated with the originating source of the synchronization signal or may be pre-configured. In some of these embodiments, the configuration details of the hopping (hopping type, etc.) may be indicated as part of the D2D discovery zone/discovery period configuration or pre-configured for UEs that perform D2D discovery outside network coverage.

FIG. 3 illustrates Type I intra-subframe D2D discovery hopping in accordance with some embodiments. For Type 1 intra-subframe hopping 300, the hopping pattern may comprise one of a plurality of intra-subframe hopping patterns and may be based at least in part on the bandwidth 208 of the discovery zone 204. The hopping pattern may be selected or determined by the UE 102 or the eNB 104. The hopping pattern may also be assigned by the eNB 104. The hopping pattern may be one of a plurality of predetermined hopping patterns, such as one of the hopping patterns illustrated in Table 1 (below).

For Type 1 intra-subframe D2D discovery hopping, the discovery signal 101 may be transmitted in first and second slots 304A and 304B of an initially selected subframe 302. The PRBs 306A and 306B of the first and second slots have different frequencies. The PRBs 306A and 306B may also be selected based on the intra-subframe hopping pattern and may be selected for frequency diversity within the discovery zone bandwidth 208.

In these embodiments that use Type 1 intra-subframe hopping, the discovery signal 101 may be transmitted in two or more adjacent PRBs of the same slot. In the example illustrated in FIG. 3, the discovery signal 101 is transmitted in two adjacent PRBs 306A in the first slot 304A and in two adjacent PRBs 306B in the second slot 304B. As shown in Table 1, intra-subframe hopping pattern 1 may be selected for a discovery zone bandwidth 208 of less than 50 PRBs (in the frequency dimension) and intra-subframe hopping pattern 1, 2 or 3 may be selected for a discovery zone bandwidth 208 of at least 50 PRBs.

In these embodiments, the UE 102 may initially be assigned by eNB (for closed D2D discovery) or may randomly choose (for open D2D discovery) a subframe with index $n_{SF}$ and starting RB index $n_{RB}$ within the discovery zone 204. With intra-subframe based type 1 D2D discovery hopping, $n_{SF}^{start} \le n_{SF} \le n_{SF}^{start} + N_{SF}^{D2D} - 1$ and $n_{RB}^{start} \leq n_{RB} \leq n_{RB}^{start} + N_{RB}^{D2D} - 1$. In the first slot (e.g., slot 304A) the UE 102 may transmit a discovery packet with starting RB index $n_{RB}^{s1} = n_{RB}$ over a set of consecutive $L_{RB}^{D2D}$ RBs. In the second slot (e.g., slot 304B) of the same subframe 302, the UE 102 may determine the starting RB index $n_{RB}^{s2}$ according to allocated D2D discovery zone bandwidth 208 and one of the hopping patterns in Table 1. These explicit hopping patterns may help guarantee hopping of the ½, ¼, and −¼ of D2D discovery zone bandwidth 208, respectively.

For a D2D discovery zone bandwidth 208 of less than fifty RBs, the first hopping pattern (Hopping Pattern 1) in Table 1 may be applied, while for a D2D discovery zone bandwidth 208 greater than 50 RBs, one of the hopping patterns (Hopping Pattern 1, 2 or 3) may be applied. The selection between these three hopping patterns may be provided by higher layer in a cell-specific manner.

TABLE 1

Hopping pattern for Type 1 intra-subframe hopping

| Hopping Pattern | $n_{RB}^{s2}$ |
|---|---|
| 1 | $(\lfloor N_{RB}^{D2D}/2 \rfloor + n_{RB}^{s1} - n_{RB}^{start}) \bmod N_{RB}^{D2D} + n_{RB}^{start}$ |
| 2 | $(\lfloor N_{RB}^{D2D}/4 \rfloor + n_{RB}^{s1} - n_{RB}^{start}) \bmod N_{RB}^{D2D} + n_{RB}^{start}$ |
| 3 | $(-\lfloor N_{RB}^{D2D}/4 \rfloor + n_{RB}^{s1} - n_{RB}^{start}) \bmod N_{RB}^{D2D} + n_{RB}^{start}$ |

In the example embodiment illustrated in FIG. 3, $N_{RB}^{D2D}=12$, $n_{RB}^{start}=0$, $N_{SF}^{D2D}=4$, $n_{SF}^{start}=0$ and $L_{RB}^{D2D}=2$. Initially, the UE 102 may randomly choose a subframe in the discovery zone as $n_{SF}=2$ and the starting RB index as $n_{RB}=2$. In these Type 1 intra-subframe D2D discovery hopping embodiments, the UE 102 would transmit a discovery packet in RB index 2 and 3 in the first slot and RB index 8 and 9 in the second slot in subframe 2, as highlighted in FIG. 3.

FIG. 4 illustrates Type 1 inter-subframe D2D discovery hopping in accordance with some embodiments. For Type 1 inter-subframe hopping 400, the discovery signal 101 may be transmitted in first and second slots (e.g., slots 404A and 404B) of an initially selected subframe 402A. The PRBs 406A and 406B of the first and second slots of the initially selected subframe 402A may have the same frequencies. A discovery signal 101 may also be transmitted in first and second slots (e.g., slots 404C and 404D) of a subsequent selected subframe 402B. The PRBs 406C and 406D of the first and second slots of subsequent selected subframe 402B may have the same frequencies. In these embodiments, the frequencies of the PRBs (406A and 406B) of the first and second slots of the initially selected subframe 402A are different from the frequencies of the PRBs (406C and 406D) of the first and second slots of the subsequent selected subframe 402B and are selected based on a hopping pattern for frequency diversity within the discovery zone bandwidth 208.

In these embodiments that use Type 1 inter-subframe hopping 400, the discovery signal 101 may be transmitted within a set of two consecutive subframes 402A and 402B. The PRBs 406A and 406B of the first subframe 402A and the PRBs 406C and 406D of the second subframe 402A may be separated by a number of PRBs in frequency to provide frequency diversity. Although FIG. 4 illustrates the transmission of one discovery packet per PRB in the frequency domain within a particular slot, the scope of the embodiments is not limited in this respect as a discovery packet may be transmitted in multiple PRBs in the frequency domain for a particular slot.

In these embodiments that use Type 1 inter-subframe hopping 400, the discovery signal is spread in the frequency domain over time in order to increase the frequency diversity. Similar to intra-subframe hopping for open D2D discovery, initially the UE 102 may randomly select a subframe $n_{SF}$ ($n_{SF}^{start} \leq n_{SF} \leq n_{SF}^{start} + N_{SF}^{D2D} - L_{SF}$) and the starting RB index $n_{RB}$ within the discovery zone 204, where $L_{SF}$ is the number of subframes allocated for each discovery packet. With inter-subframe hopping, the UE 102 may transmit the discovery packet in a set of consecutive subframes, with $L_{RB}$ RB pairs allocated in each subframe, i.e., $L_{RB}^{D2D} = L_{RB} \cdot L_{SF}$. For the subframe with index $i$ ($n_{SF} \leq i \leq n_{SF} + L_{SF} - 1$), the UE 102 may calculate the RB pair index $n_{RB}(i)$ based on the following equation:

$$n_{RB}(i) = (\lfloor N_{RB}^{D2D}/L_{SF} \rfloor \cdot (i - n_{SF}) + n_{RB} - n_{RB}^{start}) \bmod N_{RB}^{D2D} + n_{RB}^{start}$$

In the example illustrated in FIG. 4, $N_{RB}^{D2D}=12$, $n_{RB}^{start}=0$, $N_{SF}^{D2D}=4$, $n_{SF}^{start}=0$, $L_{RB}^{D2D}=2$ and $L_{SF}=2$. Initially, the UE 102 may randomly select a subframe in the discovery zone 204 as $n_{SF}=1$ and the starting RB index as $n_{RB}=2$. In this example, based on inter-subframe D2D discovery hopping, the UE 102 may transmit the discovery packet in a RB pair with index 2 in subframe 1 and the RB pair with index 8 in subframe 2.

FIG. 5 illustrates Type 1 joint intra/inter-subframe D2D discovery hopping in accordance with some embodiments. For Type 1 joint intra/inter-subframe hopping 500, the discovery signal 101 may be transmitted in first and second slots (e.g., slots 504A and 504B) of an initially selected subframe 502A. The PRBs 506A and 506B of the first and second slots of the initially selected subframe 502A may have the different frequencies. The discovery signal 101 may be transmitted in first and second slots (e.g., slots 504C and 504D) of a subsequent selected subframe 502B. The PRBs 506C and 506D of the first and second slots of subsequent selected subframe 502B may have different frequencies. The frequencies of the PRBs 506A and 506B of the first and second slots of the initially selected subframe 502A are different from the frequencies of the PRBs 506C and 506D of the first and second slots of the subsequent selected subframe 502B and are selected based on a hopping pattern for frequency diversity within the discovery zone bandwidth 208.

Although the example of Type 1 joint intra/inter-subframe hopping 500 of FIG. 5 illustrates the transmission of one discovery packet per PRB in the frequency domain within a particular slot, the scope of the embodiments is not limited in this respect as a discovery packet may be transmitted in multiple PRBs in the frequency domain for a particular slot.

In some embodiments, Type 1 joint intra/inter-subframe D2D discovery hopping may comprise a combination of intra-subframe and inter-subframe hopping that can also be configured for D2D discovery. In these embodiments, the hopping pattern for each slot $n_s$ may be determined by the following equation:

$$n_{RB}(n_s) = (\lfloor N_{RB}^{D2D}/(2L_{SF}) \rfloor \cdot (n_s - 2n_{SF}) + n_{RB} - n_{RB}^{start}) \bmod N_{RB}^{D2D} + n_{RB}^{start} \quad n_{SF} \leq \lfloor n_s/2 \rfloor \leq n_{SF} + L_{SF} - 1$$

In the example of FIG. 5, the configuration parameters are adopted from the example of FIG. 4 and are based on the above equation.

FIG. 6 illustrates Type 2 intra-subframe D2D discovery hopping in accordance with some embodiments. For Type 2 intra-subframe hopping 600, the discovery signal 101 may be transmitted in first and second slots (e.g., slots 604A and 604B) of an initially selected subframe 602. The PRBs (606A and 606B) of the first and second slots are selected to be with different subbands (e.g., subbands 603A and 603B) and may be mirrored with respect to either the different subbands or a center 601 of the discovery zone 204. In these embodiments, the PRBs 606A and 606B are mirrored with respect to the subband 603B. In the example illustrated in FIG. 6, discovery packets are transmitted in subbands 603A and 604B in accordance with the subband hopping and mirroring technique, and no discovery packets are transmitted in subbands 605A and 605B.

FIG. 7 illustrates Type 2 inter-subframe D2D discovery hopping in accordance with some embodiments. For Type 2 inter-subframe hopping 700, the discovery signal 101 may be transmitted in first and second slots (e.g., slots 704A and 704B) of an initially selected subframe 702A. The PRBs 706A and 706B of the first and second slots of the initially selected subframe 702A have the same frequencies within a first subband 703B. A discovery signal 101 may also be transmitted in first and second slots (e.g., slots 704C and 704D) of a subsequent selected subframe 702B. The PRBs 706C and 706D of the first and second slots of subsequent selected subframe 702B have the same frequencies within a second subband 703A. In these embodiments, the first and second subbands are selected in accordance with subband hopping and the PRBs within the subbands are mirrored with respect to either the subbands or a center 701 of the discovery zone 204. The subframes 702A and 702B may be selected based on a hopping function.

Although FIG. 7 illustrates the transmission of one discovery packet per PRB in the frequency domain within a particular slot, the scope of the embodiments is not limited in this respect as a discovery packet may be transmitted in multiple PRBs in the frequency domain for a particular slot.

FIG. 8 illustrates Type 2 joint intra/inter-subframe D2D discovery hopping in accordance with some embodiments. For Type 2 joint intra/inter-subframe hopping 800, the discovery signal 101 may be transmitted in first and second slots (e.g., slots 804A and 804B) of an initially selected subframe 802A. The PRBs 806A and 806B may be selected to be with different subbands (e.g., subbands 803A and 803B) in accordance with a hopping function and mirrored in accordance with a mirroring function with respect to either the different subbands or a center 801 of the discovery zone 204. A discovery signal 101 may also be transmitted in first and second slots (e.g., slots 804C and 804D) of a subsequent selected subframe 802B. The PRBs 806C and 806D may be selected to be with different subbands (e.g., subbands 803A and 805A) based on a hopping function.

In the example illustrated in FIG. 8, the PRBs (806A and 806B) of an initially selected subframe 802A may be selected to be with different subbands (803A and 803B) and may be mirrored. In this example, no discovery signal is transmitted in subband 805B. Although FIG. 8 illustrates the transmission of one discovery packet per PRB in the frequency domain within a particular slot, the scope of the embodiments is not limited in this respect as a discovery packet may be transmitted in multiple PRBs in the frequency domain for a particular slot.

In the examples and embodiments illustrated in FIGS. 6, 7 and 8 for Type 2 hopping, the number of subbands in the D2D discovery zone 204 (FIG. 2) may be defined as $N_{sb}^{D2D}$, which may be provided by higher layer in a cell-specific manner. In some embodiments, the same subband information may be coordinated among multiple cells in order to enable inter-cell D2D discovery. For open D2D discovery, a UE 102 may first randomly choose the subframe $n_{SF}$ and starting RB index $n_{RB}$ within the discovery zone 204. For the intra-subframe hopping mode and the joint intra/inter-subframe hopping mode, the starting RB index $n_{RB}$ may be selected in a way such that consecutive $L_{RB}$ RBs are in the same subband.

When Type 2 D2D discovery hopping is enabled, the set of RBs to be used for discovery packet transmission in slot $n_s$ may be determined by the following equation:

$$n_{RB}(n_s) = \\ \left(f_{hop}(i) \cdot N_{RB}^{sb,D2D} + f_m(i) \cdot n_{RB}^{mirror} + n_{RB} - n_{RB}^{start}\right) \bmod \left(N_{RB}^{sb,D2D} \cdot N_{sb}^{D2D}\right) + \\ n_{RB}^{start}$$

$$n_{RB}^{mirror} = \left(N_{RB}^{sb,D2D} - 1\right) - 2\left(n_{RB} \bmod N_{RB}^{sb,D2D}\right)$$

$$N_{RB}^{sb,D2D} = \lfloor N_{RB}^{D2D} / N_{sb}^{D2D} \rfloor$$

$$i = \begin{cases} \lfloor n_s/2 \rfloor & \text{inter-subframe hopping} \\ n_s & \text{intra and joint intra and inter-subframe hopping} \end{cases}$$

In these embodiments, the range of slot $n_s$ for open D2D discovery may be defined as:

for intra-subframe hopping, $\lfloor n_s/2 \rfloor = n_{SF}$;

for inter and joint intra and inter-subframe hopping, $n_{SF} \leq \lfloor n_s/2 \rfloor \leq n_{SF} + L_{SF} - 1$.

In these embodiments, the hopping function $f_{hop}(i)$ and the mirroring function $f_m(i)$ may be given by the following:

$$f_{hop}(i) = \begin{cases} 0 & N_{sb}^{D2D} = 1 \\ \left(f_{hop}(i-1) + \sum_{k=i\cdot 10+1}^{i\cdot 10+9} c(k) \times 2^{k-(i\cdot 10+1)}\right) \bmod N_{sb}^{D2D} & N_{sb}^{D2D} = 2 \\ \left(f_{hop}(i-1) + \left(\sum_{k=i\cdot 10+1}^{i\cdot 10+9} c(k) \times 2^{k-(i\cdot 10+1)}\right) \bmod (N_{sb}^{D2D} - 1) + 1\right) \bmod N_{sb}^{D2D} & N_{sb}^{D2D} > 2 \end{cases}$$

$$f_m(i) = \begin{cases} i \bmod 2 & N_{sb}^{D2D} = 1 \text{ and intra and joint intra} \\ & \text{and inter-subframe hopping} \\ c(i \cdot 10) & N_{sb}^{D2D} > 1 \end{cases}$$

Where $f_{hop}(-1) = 0$ and a pseudo-random sequence c(i), such as the pseudo-random sequence c(i) of section 7.2 of 3GPP TS 36.212. The pseudo-random sequence generator may be initialized with $c_{init} = N_{ID}^{D2D}$ for frame structure type 1 and $c_{init} = 2^9 \cdot (n_f \bmod 4) + N_{ID}^{D2D}$ for frame structure type 2 at the start of each frame, where $N_{ID}^{D2D}$ can be cell ID $N_{ID}^{cell}$ for inn-a-cell discovery or virtual cell ID $N_{ID}^{VCID}$ for inter-cell D2D discovery.

In the examples illustrated in FIGS. 6-8, it is assumed that $N_{RB}^{D2D}=12$, $n_{RB}^{start}=0$, $N_{SF}^{D2D}=4$, $n_{SF}^{start}=0$, $L_{RB}^{D2D}=2$, $N_{sb}^{D2D}=3$ and $N_{ID}^{D2D}=2$. Initially, the UE 102 may randomly choose a subframe in the discovery zone 204 as $n_{SF}=1$ and the starting RB index as $n_{RB}=1$. For intra-subframe hopping, $L_{RB}=2$ and $L_{SF}=1$; for inter and joint intra and inter-subframe hopping, $L_{RB}=1$ and $L_{SF}=2$.

Figure 9:
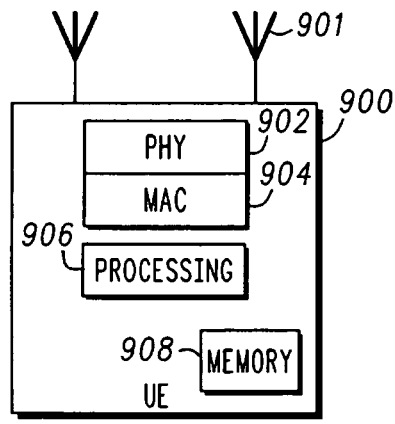
FIG. 9 illustrates a functional block diagram of a UE in accordance with some embodiments.

FIG. 9 illustrates a functional block diagram of a UE in accordance with some embodiments. The UE 900 may be suitable for use as any one or more of the UEs 102 illustrated in FIG. 1. The UE 900 may include physical layer circuitry 902 for transmitting and receiving signals to and from eNBs 104 (FIG. 1) using one or more antennas 901. UE 900 may also include medium access control layer (MAC) circuitry 904 for controlling access to the wireless medium. UE 900 may also include processing circuitry 906 and memory 908 arranged to configure the various elements of the UE to perform the operations described herein.

In accordance with some embodiments, the UE 900, while in either RRC idle or RRC connected mode, may be configured to transmit a discovery signal 101 (FIG. 1) to discover another UE as described herein and receive responses to the discovery signal 101 from another UE. The UE 900 may also be configured to monitor and attempt to decode a discovery signal that is transmitted in the discovery zone 204 (FIG. 2) by another UE for discovery by another UE. The UE 900 may also be arranged to establish a D2D connection with another UE after either discovering the another UE or after being discovered by the another UE. The channel resources for the D2D discovery and the D2D connection may be assigned by the eNB 104.

In some embodiments, the decoding of the discovery signals may be based on blindly identifying the DM-RS cyclic shifts (i.e., blind detection of the discovery packets) or may be done by first blindly decoding a preamble (other than or in addition to) the DM-RS embedded in a discovery packet transmission and using the detected information to decode the discovery packet. In some embodiments, UEs 102 (FIG. 1) may be explicitly or implicitly signaled (i.e., by the eNB 104 or another UE) to monitor and attempt to receive discovery signals on certain discovery resources instead of all resources within the discovery zone 204 (e.g., a discovery resource pool).

In some embodiments, the UE 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 900 may include one or more of a keyboard, a display, a non-volatile memory port, multiple antennas, a graphics processor, an application processor, speakers, and other mobile device elements. The display may be an LCD screen including a touch screen.

The one or more antennas 901 utilized by the UE 900 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 900 may be configured with the instructions to perform the operations described herein.

In some embodiments, the UE 900 may be configured to receive orthogonal frequency division multiplexed (OFDM) communication signals over a multicarrier communication channel in accordance with an orthogonal frequency division multiple access (OFDMA) communication technique. The OFDM signals may comprise a plurality of orthogonal subcarriers. In some embodiments, the OFDMA technique may be either a frequency domain duplexing (FDD) technique that uses different uplink and downlink spectrum or a time-domain duplexing (TDD) technique that uses the same spectrum for uplink and downlink.

In some LTE embodiments, two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some other embodiments, the UE 900 and the eNBs 104 may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 900 may calculate several different feedback values which may be used to perform channel adaptation for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 900. The CQI allows the UE 900 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

Figure 10:
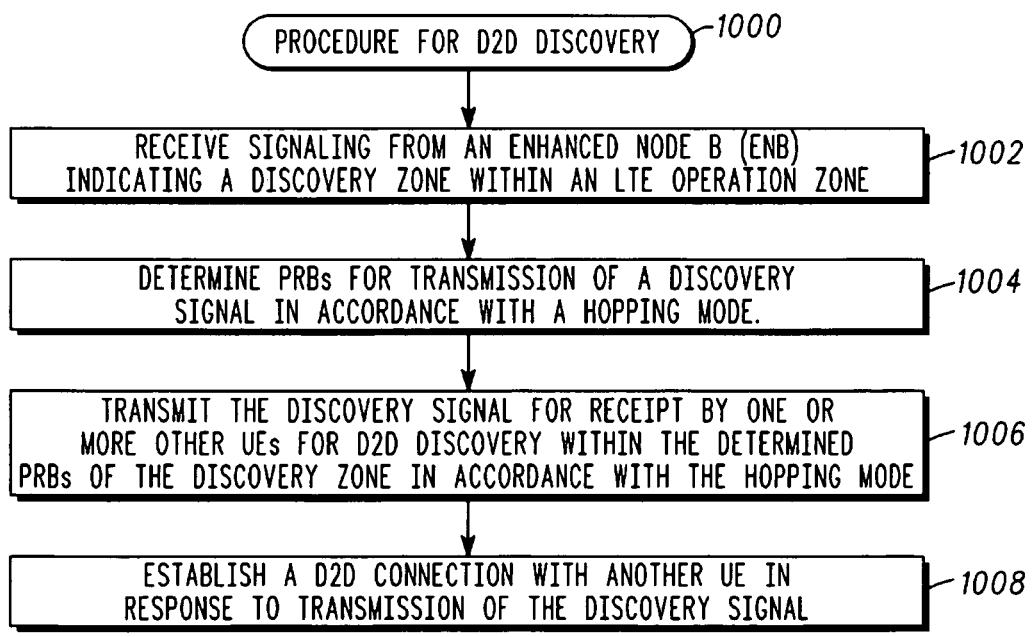
FIG. 10 is a procedure for D2D discovery hopping discovery in accordance with some embodiments.

FIG. 10 is a procedure for D2D discovery hopping in accordance with some embodiments. Procedure 1000 may be performed by a UE, such as UE 102 (FIG. 1), for discovering another UE and establishing a D2D connection with a discovered UE.

Operation 1002 may comprise receiving signaling from an eNB 104 (FIG. 1) indicating a discovery zone 204 (FIG. 2) within an LTE operation zone 202 (FIG. 2). The discovery zone 204 may comprise a plurality of PRBs 206 (FIG. 2).

Operation 1004 may comprise determining PRBs 206 within the discovery zone 204 for transmission of a discovery signal in accordance with a hopping mode. The hopping mode may comprise intra-subframe hopping, inter-subframe hopping or joint intra/inter-subframe hopping. As discussed above, the UE 102 may be configured for either Type 1 hopping or Type 2 hopping in accordance with one of the hopping modes.

Operation 1006 may comprise transmitting a discovery signal 101 (FIG. 1) for receipt by one or more other UEs 102 for D2D discovery within the determined PRBs 206 of the discovery zone 204. In these embodiments, the PRBs 206 for transmission of the discovery signal 101 are determined in accordance with the hopping mode. The transmission of a discovery signal on PRBs that are determined in accordance with a hopping mode may provide increased frequency diversity within the bandwidth 208 (FIG. 2) of the discovery zone 204.

In an example, User Equipment (UE) arranged for device-to-device (D2D) discovery operations in an LTE network. The UE configured to: receive signaling from an enhanced node B (eNB) indicating discovery resources within an LTE operation zone, the discovery resources comprising a plurality of physical resource blocks (PRBs); and transmit a discovery signal for receipt by one or more other UEs for D2D discovery within at least some PRBs of the discovery resources, wherein the PRBs for transmission of the discovery signal are in accordance with a hopping mode and provide increased frequency diversity within a bandwidth of the discovery zone.

In another example, when the signaling from the eNB indicates that the discovery resources comprises a discovery zone, the UE is arranged to determine the PRBs for transmission of the discovery signal within the discovery zone in accordance with the hopping mode.

In another example, the hopping mode comprises one of intra-subframe hopping, inter-subframe hopping or joint intra/inter-subframe hopping.

In another example, when hopping for D2D discovery is enabled, the discovery signal is transmitted within the determined PRBs in accordance with the hopping mode, and wherein when hopping for D2D discovery is not enabled, the UE is arranged to transmit the discovery signal: over consecutive RB pairs within one subframe and/or spread over a set of consecutive subframes with a same RB index.

In another example, the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal.

In another example, wherein the signaling received from the eNB indicating the discovery zone is either semi-statically signaled using radio-resource control (RRC) signaling or is provided in one or more system-information blocks (SIBs), wherein the UE is configurable by the eNB for either Type 1 D2D discovery or Type 2 D2D discovery, wherein when configured for Type 1 D2D discovery, resources for transmission of the discovery signal are allocated by the eNB on a non-UE specific basis, and wherein when configured for Type 2 D2D discovery, specific resources for transmission of the discovery signal are allocated by the eNB to the UE for transmission of the discovery signal.

In another example, for Type 1 intra-subframe hopping: a hopping pattern comprises one of a plurality of intra-subframe hopping patterns and is based at least in part on the bandwidth of the discovery zone, and the discovery signal is transmitted in first and second slots of an initially selected subframe, wherein the PRBs of the first and second slots have different frequencies, the PRBs selected based on the intra-subframe hopping pattern and are selected for frequency diversity within the discovery zone bandwidth.

In another example, for Type 1 inter-subframe hopping, the discovery signal is: transmitted in first and second slots of an initially selected subframe, wherein the PRBs of the first and second slots of the initially selected subframe have the same frequencies; and transmitted in first and second slots of a subsequent selected subframe, wherein the PRBs of the first and second slots of subsequent selected subframe have the same frequencies, wherein the frequencies of the PRBs of the first and second slots of the initially selected subframe are different from the frequencies of the PRBs of the first and second slots of the subsequent selected subframe and are selected based on a hopping pattern for frequency diversity within the discovery zone bandwidth.

In another example, for Type 1 joint intra/inter-subframe hopping, the discovery signal is: transmitted in first and second slots of an initially selected subframe, wherein the PRBs of the first and second slots of the initially selected subframe have the different frequencies; and transmitted in first and second slots of a subsequent selected subframe, wherein the PRBs of the first and second slots of subsequent selected subframe have the different frequencies, wherein the frequencies of the PRBs of the first and second slots of the initially selected subframe are different from the frequencies of the PRBs of the first and second slots of the subsequent selected subframe and are selected based on a hopping pattern for frequency diversity within the discovery zone bandwidth.

In another example, for Type 2 intra-subframe hopping, the discovery signal is transmitted in first and second slots of an initially selected subframe, and wherein the PRBs of the first and second slots are selected to be with different subbands and mirrored with respect to either the different subbands or a center of the discovery zone.

In another example, for Type 2 inter-subframe hopping, the discovery signal is: transmitted in first and second slots of an initially selected subframe, wherein the PRBs of the first and second slots of the initially selected subframe have the same frequencies within a first subband; and transmitted in first and second slots of a subsequent selected subframe, wherein the PRBs of the first and second slots of subsequent selected subframe have the same frequencies within a second subband, wherein the first and second subbands are selected in accordance with subband hopping and the PRBs within the subbands are mirrored with respect to either the subbands or a center of the discovery zone, and wherein the subframes are selected based on a hopping function.

In another example, for Type 2 joint intra/inter-subframe hopping, the discovery signal is: transmitted in first and second slots of an initially selected subframe, wherein the PRBs are selected to be with different subbands in accordance with a hopping function and mirrored in accordance with a mirroring function with respect to either the different subbands or a center of the discovery zone; and transmitted in first and second slots of a subsequent selected subframe, wherein the PRBs are selected to be with different subbands.

In another example, while in either radio-resource control (RRC) idle or RRC connected mode, is further configured to: transmit the discovery signal to discover another UE and receive responses to the discovery signal from the another UE; monitor and attempt to decode a discovery signal transmitted in the discovery zone by another UE for discovery by the another UE; establish a D2D connection with the another UE after either discovering the another UE or after being discovered by the another UE, wherein channel resources for the D2D connection are assigned by the eNB.

In another example, a method is performed by User Equipment (UE) for device-to-device (D2D) discovery operations in an LTE network. The method comprises: receiving signaling from an enhanced node B (eNB) indicating discovery resources within an LTE operation zone, the discovery resources comprising a plurality of physical resource blocks (PRBs); and transmitting a discovery signal for receipt by one or more other UEs for D2D discovery within at least some PRBs of the discovery resources, wherein the PRBs for transmission of the discovery signal are in accordance with a hopping mode and provide increased frequency diversity within a bandwidth of the discovery zone.

In another example, when the signaling from the eNB indicates that the discovery resources comprises a discovery zone, the method includes the UE determining the PRBs for transmission of the discovery signal within the discovery zone in accordance with the hopping mode.

In another example, the hopping mode comprises one of intra-subframe hopping, inter-subframe hopping or joint intra/inter-subframe hopping.

In another example, the UE is configured for either Type 1 hopping or Type 2 hopping in accordance with one of the hopping modes, wherein when configured for Type 1 hopping, the method includes using an explicit hopping pattern to determine the PRBs for the transmission of the discovery signal, and wherein when configured for Type 2 hopping, the method includes using a subband hopping and mirroring technique to determine the PRBs for the transmission of the discovery signal.

In another example, the signaling received from the eNB indicating the discovery zone is either semi-statically signaled using radio-resource control (RRC) signaling or is provided in one or more system-information blocks (SIBs), wherein the UE is configurable by the eNB for either Type 1 D2D discovery or Type 2 D2D discovery, wherein when configured for Type 1 D2D discovery, resources for transmission of the discovery signal are allocated by the eNB on a non-UE specific basis, and wherein when configured for Type 2 D2D discovery, specific resources for transmission of the discovery signal are allocated by the eNB to the UE for transmission of the discovery signal.

In another example, a non-transitory computer-readable storage medium that stores instructions for execution by one or more processors is arranged to perform operations for device-to-device (D2D) discovery. The operations may configure user equipment (UE) for: receiving signaling from an enhanced node B (eNB) indicating discovery resources within an LTE operation zone, the discovery resources comprising a plurality of physical resource blocks (PRBs); and transmitting a discovery signal for receipt by one or more other UEs for D2D discovery within at least some PRBs of the discovery resources, wherein the PRBs for transmission of the discovery signal are in accordance with a hopping mode and provide increased frequency diversity within a bandwidth of the discovery zone.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) arranged for device-to-device (D2D) discovery operations in a wireless network, the UE comprising:
   wireless communication circuitry; and
   one or more processors coupled to the wireless communication circuitry, wherein the one or more processor are configured to:
      receive signaling from a base station indicating discovery resources within an operation zone, the discovery resources comprising a plurality of physical resource blocks (PRBs);
      transmit a discovery signal for receipt by one or more other UEs for D2D discovery within at least some PRBs of the discovery resources, the discovery signal including a discovery packet with payload information having one or more of an identification for the transmitting UE or a service, wherein the payload information protected by a cyclic-redundancy check; and transmit a demodulation reference signal for use by the one or more other UEs, wherein the PRBs for transmission of the discovery signal are in accordance with a hopping mode, wherein the hopping mode includes hopping over PRBs by a PRB step size, wherein the PRB step size is a function of the number of PRBs allocated for D2D and the number of subframes allocated for the discovery packet.

2. The UE of claim 1, wherein when the signaling from the base station indicates that the discovery resources comprises a discovery zone, the UE is arranged to determine the PRBs for transmission of the discovery signal within the discovery zone in accordance with the hopping mode.

3. The UE of claim 2, wherein the hopping mode comprises one of intra-subframe hopping, inter-subframe hopping or joint intra/inter-subframe hopping.

4. An apparatus for incorporation in a User Equipment (UE) arranged for device-to-device (D2D) discovery operations in an wireless network, the apparatus comprising:
one or more processors, wherein the one or more processors are configured to cause the UE to:
receive signaling from a base station indicating discovery resources within an operation zone, the discovery resources comprising a plurality of physical resource blocks (PRBs);
transmit a discovery signal for receipt by one or more other UEs for D2D discovery within at least some PRBs of the discovery resources, wherein the PRBs for transmission of the discovery signal are in accordance with a hopping mode, wherein the hopping mode includes hopping over PRBs by a PRB step size, wherein the PRB step size is a function of the number of PRBs allocated for D2D and the number of subframes allocated for the discovery packet; and
transmit a demodulation reference signal for use by one or more other UEs.

5. The UE of claim 3, wherein the UE is configured for either Type 1 hopping or Type 2 hopping in accordance with one of the hopping modes,
wherein when configured for Type 1 hopping, the UE is configured to use an explicit hopping pattern to determine the PRBs for the transmission of the discovery signal, and
wherein when configured for Type 2 hopping, the UE is configured to use a subband hopping and mirroring technique to determine the PRBs for the transmission of the discovery signal.

6. The UE of claim 5, where the UE, while in either radio-resource control (RRC) idle or RRC connected mode, is further configured to:
transmit the discovery signal to discover another UE and receive responses to the discovery signal from the another UE;
monitor and attempt to decode a discovery signal transmitted in the discovery zone by another UE for discovery by the another UE;
establish a D2D connection with the another UE after either discovering the another UE or after being discovered by the another UE,
wherein channel resources for the D2D connection are assigned by the base station.

7. The UE of claim 5, wherein the signaling received from the base station indicating the discovery zone is either semi-statically signaled using radio-resource control (RRC) signaling or is provided in one or more system-information blocks (SIBs), wherein the UE is configurable by the base station for either Type 1 D2D discovery or Type 2 D2D discovery,
wherein when configured for Type 1 D2D discovery, resources for transmission of the discovery signal are allocated by the base station on a non-UE specific basis, and
wherein when configured for Type 2 D2D discovery, specific resources for transmission of the discovery signal are allocated by the base station to the UE for transmission of the discovery signal.

8. A User Equipment (UE) arranged for device-to-device (D2D) discovery operations in a wireless network, the UE comprising:
wireless communication circuitry; and
one or more processor coupled to the wireless communication circuitry, wherein the one or more processors are configured to:
receive signaling from a base station indicating discovery resources within an operation zone, the discovery resources comprising a plurality of physical resource blocks (PRBs); and
transmit a discovery signal for receipt by one or more other UEs for D2D discovery within at least some PRBs of the discovery resources, wherein the PRBs for transmission of the discovery signal are in accordance with a hopping mode, wherein when the signaling from the base station indicates that the discovery resources comprises a discovery zone, the UE is arranged to determine the PRBs for transmission of the discovery signal within the discovery zone in accordance with the hopping mode, wherein the hopping mode comprises one of intra-subframe hopping, inter-subframe hopping or joint intra/inter-subframe hopping,
wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal,
wherein for Type 1 intra-subframe hopping:
a hopping pattern comprises one of a plurality of intra-subframe hopping patterns and is based at least in part on the bandwidth of the discovery zone, and
the discovery signal is transmitted in first and second slots of an initially selected subframe, wherein the PRBs of the first and second slots have different frequencies, the PRBs selected based on the intra-subframe hopping pattern and are selected for frequency diversity within the discovery zone bandwidth.

9. An apparatus for incorporation in a User Equipment (UE) arranged for device-to-device (D2D) discovery operations in a wireless network, the apparatus comprising:
one or more processors, wherein the one or more processor are configured to cause the UE to:
receive signaling from a base station indicating discovery resources within an LTE operation zone, the discovery resources comprising a plurality of physical resource blocks (PRBs); and
transmit a discovery signal for receipt by one or more other UEs for D2D discovery within at least some PRBs of the discovery resources, wherein the PRBs for transmission of the discovery signal are in accordance with a hopping mode, wherein when the signaling from the base station indicates that the discovery resources comprises a discovery zone, the UE is arranged to determine the PRBs for transmission of the discovery signal within the discovery zone in accordance with the hopping mode, wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to determine the PRBs for the transmission of the discovery signal, wherein for Type 1 inter-subframe hopping, the discovery signal is:
 transmitted in first and second slots of an initially selected subframe, wherein the PRBs of the first and second slots of the initially selected subframe have the same frequencies; and
 transmitted in first and second slots of a subsequent selected subframe, wherein the PRBs of the first and second slots of subsequent selected subframe have the same frequencies,
wherein the frequencies of the PRBs of the first and second slots of the initially selected subframe are different from the frequencies of the PRBs of the first and second slots of the subsequent selected subframe and are selected based on a hopping pattern for frequency diversity within the discovery zone bandwidth.

10. A User Equipment (UE) arranged for device-to-device (D2D) discovery operations in a wireless network, the UE comprising:
 wireless communication circuitry; and
 one or more processors coupled to the wireless communication circuitry, wherein the one or more processors are configured to:
  receive signaling from a base station indicating discovery resources within an operation zone, the discovery resources comprising a plurality of physical resource blocks (PRBs); and
  transmit a discovery signal for receipt by one or more other UEs for D2D discovery within at least some PRBs of the discovery resources, wherein the PRBs for transmission of the discovery signal are in accordance with a hopping mode, wherein when the signaling from the base station indicates that the discovery resources comprises a discovery zone, the UE is arranged to determine the PRBs for transmission of the discovery signal within the discovery zone in accordance with the hopping mode, wherein the hopping mode comprises one of intra-subframe hopping, inter-subframe hopping or joint intra/inter-subframe hopping,
 wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal, wherein for Type 1 joint intra/inter-subframe hopping, the discovery signal is:
  transmitted in first and second slots of an initially selected subframe, wherein the PRBs of the first and second slots of the initially selected subframe have the different frequencies; and
  transmitted in first and second slots of a subsequent selected subframe, wherein the PRBs of the first and second slots of subsequent selected subframe have the different frequencies,
 wherein the frequencies of the PRBs of the first and second slots of the initially selected subframe are different from the frequencies of the PRBs of the first and second slots of the subsequent selected subframe and are selected based on a hopping pattern for frequency diversity within the discovery zone bandwidth.

11. An apparatus for incorporation in a User Equipment (UE) arranged for device-to-device (D2D) discovery operations in a wireless network, the apparatus comprising: one or more processors, wherein the one or more processors are configured to cause the UE to:
 receive signaling from a base station indicating discovery resources within an LTE operation zone, the discovery resources comprising a plurality of physical resource blocks (PRBs); and
 transmit a discovery signal for receipt by one or more other UEs for D2D discovery within at least some PRBs of the discovery resources, wherein the PRBs for transmission of the discovery signal are in accordance with a hopping mode, wherein when the signaling from the base station indicates that the discovery resources comprises a discovery zone, the UE is arranged to determine the PRBs for transmission of the discovery signal within the discovery zone in accordance with the hopping mode, wherein the hopping mode comprises one of intra-subframe hopping, inter-subframe hopping or joint intra/inter-subframe hopping,
 wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal,
 wherein for Type 2 intra-subframe hopping, the discovery signal is transmitted in first and second slots of an initially selected subframe, and
 wherein the PRBs of the first and second slots are selected to be with different subbands and mirrored with respect to either the different subbands or a center of the discovery zone.

12. A User Equipment (UE) arranged for device-to-device (D2D) discovery operations in wireless network, the UE comprising:
 wireless communication circuitry; and
 one or more processors coupled to the wireless communication circuitry, wherein the one or more processors are configured to:
  receive signaling from an enhanced node B (eNB) indicating discovery resources within an LTE operation zone, the discovery resources comprising a plurality of physical resource blocks (PRBs); and
  transmit a discovery signal for receipt by one or more other UEs for D2D discovery within at least some PRBs of the discovery resources, wherein the PRBs for transmission of the discovery signal are in accordance with a hopping mode, wherein when the signaling from the eNB indicates that the discovery resources comprises a discovery zone, the UE is arranged to determine the PRBs for transmission of the discovery signal within the discovery zone in accordance with the hopping mode, wherein the hopping mode comprises one of intra-subframe hopping, inter-subframe hopping or joint intra/inter-subframe hopping, wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal, wherein for Type 2 inter-subframe hopping, the discovery signal is:

transmitted in first and second slots of an initially selected subframe, wherein the PRBs of the first and second slots of the initially selected subframe have the same frequencies within a first subband; and transmitted in first and second slots of a subsequent selected subframe, wherein the PRBs of the first and second slots of subsequent selected subframe have the same frequencies within a second subband, wherein the first and second subbands are selected in accordance with subband hopping and the PRBs within the subbands are mirrored with respect to either the subbands or a center of the discovery zone, and wherein the subframes are selected based on a hopping function.

13. An apparatus for incorporation in a User Equipment (UE) arranged for device-to-device (D2D) discovery operations in a wireless network, the apparatus comprising:

one or more processors, wherein the one or more processors are configured to cause the UE to:

receive signaling from base station indicating discovery resources within an operation zone, the discovery resources comprising a plurality of physical resource blocks (PRBs); and transmit a discovery signal for receipt by one or more other UEs for D2D discovery within at least some PRBs of the discovery resources, wherein the PRBs for transmission of the discovery signal are in accordance with a hopping mode, wherein when the signaling from the base station indicates that the discovery resources comprises a discovery zone, the UE is arranged to determine the PRBs for transmission of the discovery signal within the discovery zone in accordance with the hopping mode, wherein the hopping mode comprises one of intra-subframe hopping, inter-subframe hopping or joint intra/inter-subframe hopping, wherein the UE is configured for either Type 1 hopping or Type 2 hopping in accordance with one of the hopping modes, wherein when configured for Type 1 hopping, the UE is configured to use an explicit hopping pattern to determine the PRBs for the transmission of the discovery signal, and wherein when configured for Type 2 hopping, the UE is configured to use a subband hopping and mirroring technique to determine the PRBs for the transmission of the discovery signal, wherein for Type 2 joint intra/inter-subframe hopping, the discovery signal is:

transmitted in first and second slots of an initially selected subframe, wherein the PRBs are selected to be with different subbands in accordance with a hopping function and mirrored in accordance with a mirroring function with respect to either the different subbands or a center of the discovery zone; and transmitted in first and second slots of a subsequent selected subframe, wherein the PRBs are selected to be with different subbands.

14. A method performed by User Equipment (UE) for device-to-device (D2D) discovery operations in wireless network, the method comprising:

by the UE:

receiving signaling from a base station indicating discovery resources within an operation zone, the discovery resources comprising a plurality of physical resource blocks (PRBs);

transmitting a discovery signal for receipt by one or more other UEs for D2D discovery within at least some PRBs of the discovery resources, the discovery signal including a discovery packet with payload information having one or more of an identification for the transmitting UE or a service, the payload information protected by a cyclic-redundancy check; and transmitting a demodulation reference signal for use by the one or more other UEs, wherein the PRBs for transmission of the discovery signal are in accordance with a hopping mode and provide increased frequency diversity, wherein the hopping mode includes hopping over PRBs by a PRB step size, wherein the PRB step size is a function of the number of PRBs allocated for D2D and the number of subframes allocated for the discovery packet.

15. The method of claim 14, wherein when the signaling from the base station indicates that the discovery resources comprises a discovery zone, the method includes the UE determining the PRBs for transmission of the discovery signal within the discovery zone in accordance with the hopping mode.

16. The method of claim 14, wherein the hopping mode comprises one of intra-subframe hopping, inter-subframe hopping or joint intra/inter-subframe hopping.

17. The method of claim 16, wherein the UE is configured for either Type 1 hopping or Type 2 hopping in accordance with one of the hopping modes, wherein when configured for Type 1 hopping, the method includes using an explicit hopping pattern to determine the PRBs for the transmission of the discovery signal, and wherein when configured for Type 2 hopping, the method includes using a subband hopping and mirroring technique to determine the PRBs for the transmission of the discovery signal.

18. The method of claim 17, wherein the signaling received from the base station indicates the discovery zone is either semi-statically signaled using radio-resource control (RRC) signaling or is provided in one or more system-information blocks (SIBs), wherein the UE is configurable by the base station for either Type 1 D2D discovery or Type 2 D2D discovery, wherein when configured for Type 1 D2D discovery, resources for transmission of the discovery signal are allocated by the base station on a non-UE specific basis, and wherein when configured for Type 2 D2D discovery, specific resources for transmission of the discovery signal are allocated by the base station to the UE for transmission of the discovery signal.

19. A non-transitory computer-readable storage medium that stores instructions for execution by one or more processors to perform operations for device-to-device (D2D) discovery, the operations to configure user equipment (UE) for:

receiving signaling from a base station indicating discovery resources within an operation zone, the discovery resources comprising a plurality of physical resource blocks (PRBs);

transmitting a discovery signal for receipt by one or more other UEs for D2D discovery within at least some PRBs of the discovery resources, the discovery signal including a discovery packet with payload information having one or more of an identification for the transmitting UE or a service, the payload information protected by a cyclic-redundancy check; and transmitting a demodulation reference signal for use by the one or more other UEs, wherein the PRBs for transmission of the discovery signal are in accordance with a hopping mode and provide increased frequency diversity, wherein the hopping mode includes hopping over PRBs by a PRB step size, wherein the PRB step size is a function of the number of PRBs allocated for D2D and the number of subframes allocated for the discovery packet.

20. The non-transitory computer-readable storage medium of claim 19, wherein when the signaling from the base station indicates that the discovery resources comprises a discovery zone, the method includes the UE determining the PRBs for transmission of the discovery signal within the discovery zone in accordance with the hopping mode.

* * * * *